United States Patent
Fujita et al.

(10) Patent No.: US 10,919,294 B2
(45) Date of Patent: Feb. 16, 2021

(54) LIQUID DISCHARGING DEVICE AND LIQUID DISCHARGING METHOD

(71) Applicants: Takuya Fujita, Aichi (JP); Hiromi Sakaguchi, Kanagawa (JP); Yuta Nakamura, Kanagawa (JP); Naoto Shimura, Tokyo (JP); Yoshiaki Masuda, Shizuoka (JP); Tetsuto Ueda, Kanagawa (JP); Yoshimi Nemoto, Kanagawa (JP); Kenichi Taguma, Kanagawa (JP); Naohiro Toda, Kanagawa (JP); Shinya Seno, Kanagawa (JP); Nobuyuki Satoh, Kanagawa (JP)

(72) Inventors: Takuya Fujita, Aichi (JP); Hiromi Sakaguchi, Kanagawa (JP); Yuta Nakamura, Kanagawa (JP); Naoto Shimura, Tokyo (JP); Yoshiaki Masuda, Shizuoka (JP); Tetsuto Ueda, Kanagawa (JP); Yoshimi Nemoto, Kanagawa (JP); Kenichi Taguma, Kanagawa (JP); Naohiro Toda, Kanagawa (JP); Shinya Seno, Kanagawa (JP); Nobuyuki Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 17 days.

(21) Appl. No.: 16/354,880

(22) Filed: Mar. 15, 2019

(65) Prior Publication Data

US 2019/0283406 A1 Sep. 19, 2019

(30) Foreign Application Priority Data

Mar. 16, 2018 (JP) .................. 2018-048872

(51) Int. Cl.
*B41J 2/045* (2006.01)
*C09D 11/38* (2014.01)
(Continued)

(52) U.S. Cl.
CPC ....... *B41J 2/04556* (2013.01); *B41J 2/04508* (2013.01); *B41J 2/04586* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2005/0116978 A1* 6/2005 Kubota ................. B41J 2/2114
347/19
2007/0242118 A1* 10/2007 Koganehira ......... C09D 11/326
347/100

(Continued)

FOREIGN PATENT DOCUMENTS

| JP | 2013-051671 | 3/2013 |
| JP | 2014-004751 | 1/2014 |
| JP | 2016-083877 | 5/2016 |

*Primary Examiner* — Manish S Shah
(74) *Attorney, Agent, or Firm* — Oblon, McClelland, Maier & Neustadt, L.L.P.

(57) ABSTRACT

A liquid discharging device includes a carriage carrying a head configured to discharge a liquid onto a target, the liquid including an ink, the ink consisting water, an organic solvent, a coloring material, and a plurality of polysiloxane compounds, a driving unit configured to move the carriage and the target relatively to each other, a measuring unit configured to measure the distance between the carriage and the target, an image-capturing unit configured to capture a target image, and a setting unit configured to set a liquid discharging performance of the head based on a measure- (Continued)

ment result obtained by the measuring unit and the target image obtained by the image-capturing unit.

20 Claims, 17 Drawing Sheets

(51) Int. Cl.
*B41J 2/21* (2006.01)
*B41J 19/14* (2006.01)
*B41J 2/15* (2006.01)
*C09D 11/40* (2014.01)

(52) U.S. Cl.
CPC ............ *B41J 2/2135* (2013.01); *B41J 19/145* (2013.01); *C09D 11/38* (2013.01); *B41J 2/15* (2013.01); *C09D 11/40* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 3/4078; B41J 11/06; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/107; D06P 1/0032; D06P 1/0096; D06P 5/001; D06P 5/02; D06P 5/2011; D06P 5/2077; D06P 5/2083; D06P 5/30; Y10T 428/24802

See application file for complete search history.

(56) References Cited

U.S. PATENT DOCUMENTS

| | | | |
|---|---|---|---|
| 2010/0149567 A1* | 6/2010 | Kanazawa | H04N 1/40006 358/1.9 |
| 2013/0027720 A1 | 1/2013 | Satoh | |
| 2014/0240546 A1* | 8/2014 | Okamoto | H04N 5/232 348/231.99 |

* cited by examiner

FIG. 10

| INK DISCHARGING SPEED [m/s] | GAP [mm] | FLIGHT TIME [us] | DISCHARGING TIME DIFFERENCE [us] | DISCHARGING TIMING CORRECTION [us] |
|---|---|---|---|---|
| 10 | 1.2 | 120 | 20 | -20 |
| 10 | 1.18 | 118 | 18 | -18 |
| 10 | 1.16 | 116 | 16 | -16 |
| 10 | 1.14 | 114 | 14 | -14 |
| 10 | 1.12 | 112 | 12 | -12 |
| 10 | 1.1 | 110 | 10 | -10 |
| 10 | 1.08 | 108 | 8 | -8 |
| 10 | 1.06 | 106 | 6 | -6 |
| 10 | 1.04 | 104 | 4 | -4 |
| 10 | 1.02 | 102 | 2 | -2 |
| 10 | 1 | 100 | 0 | 0 |
| 10 | 0.98 | 98 | -2 | 4 |
| 10 | 0.96 | 96 | -4 | 2 |
| 10 | 0.94 | 94 | -6 | 6 |
| 10 | 0.92 | 92 | -8 | 8 |
| 10 | 0.9 | 90 | -10 | 10 |
| 10 | 0.88 | 88 | -12 | 12 |
| 10 | 0.86 | 86 | -14 | 14 |
| 10 | 0.84 | 84 | -16 | 16 |
| 10 | 0.82 | 82 | -18 | 18 |
| 10 | 0.8 | 80 | -20 | 20 |

TARGET GAP

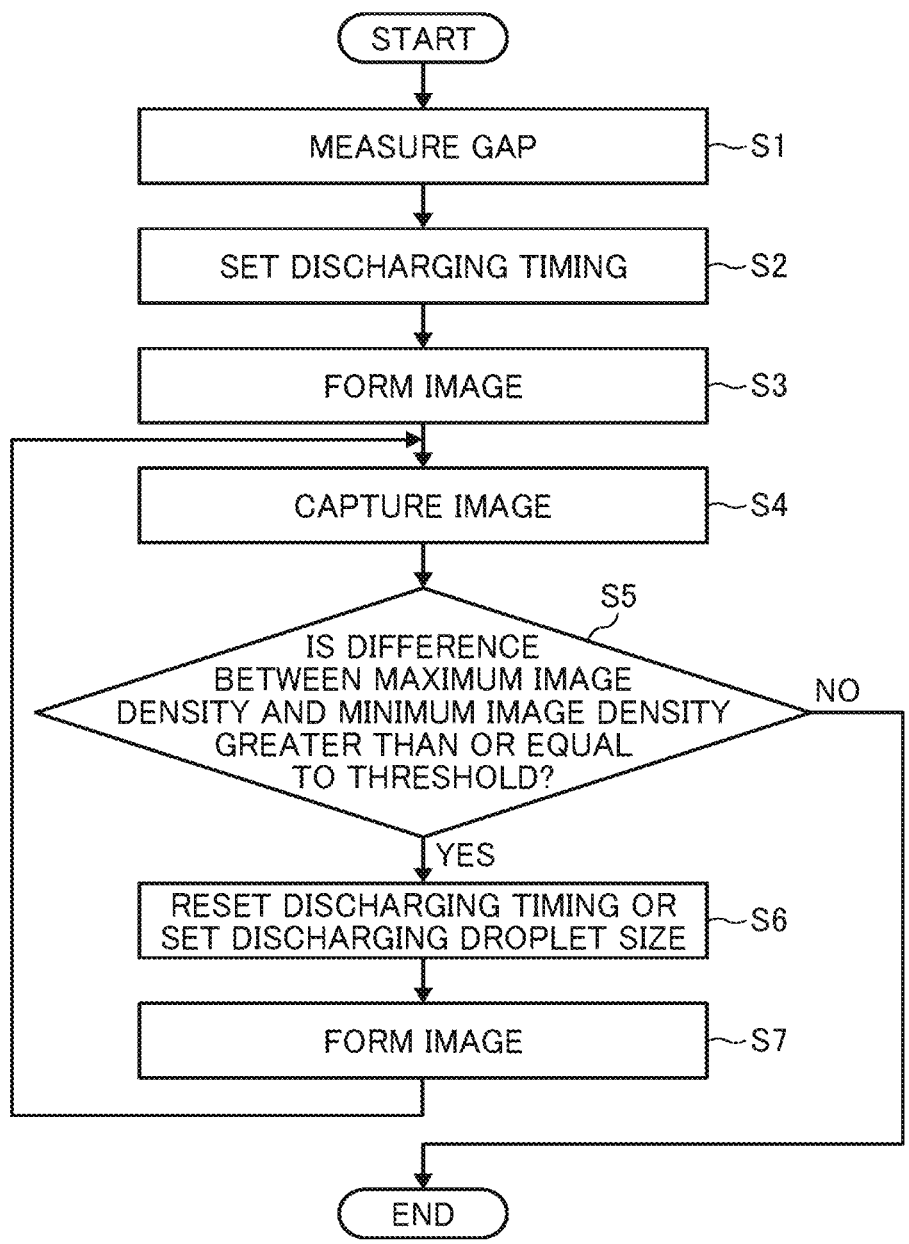

LIQUID DISCHARGING DEVICE AND LIQUID DISCHARGING METHOD

CROSS-REFERENCE TO RELATED APPLICATIONS

This patent application is based on and claims priority pursuant to 35 U.S.C. § 119 to Japanese Patent Application No. 2018-048872, filed on Mar. 16, 2018 in the Japan Patent Office, the entire disclosure of which is hereby incorporated by reference herein.

BACKGROUND

Technical Field

The present invention relates to a liquid discharging device and a liquid discharging method.

Description of the Related Art

A serial-type inkjet printer, which is a type of recording device, includes a carriage carrying a recording head and reciprocating in the main-scanning direction orthogonal to the conveyance direction of a recording medium, typically sheet or paper, over a platen. This type of inkjet printer is configured to record an image on the recording medium by reciprocating the carriage and discharging ink droplets from the recording head while conveying the recording medium over the platen. Therefore, the gap between the ink discharging surface of the recording head and the recording medium conveyance surface of the platen greatly affects the recording accuracy.

SUMMARY

According to embodiments of the present disclosure, an improved liquid discharging device which includes a carriage carrying a head configured to discharge a liquid onto a target, the liquid comprising an ink, the ink comprising water, an organic solvent, a coloring material, and a plurality of polysiloxane compounds, a driving unit configured to move the carriage and the target relatively to each other, a measuring unit configured to measure the distance between the carriage and the target, an image-capturing unit configured to capture a target image, and a setting unit configured to set a liquid discharging performance of the head based on a measurement result obtained by the measuring unit and the target image obtained by the image-capturing unit.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 10 is a table illustrating an example of a setting method for a first setting unit;

FIG. 12 is a flowchart illustrating an example of a pattern image according to an embodiment;

Figure 1:
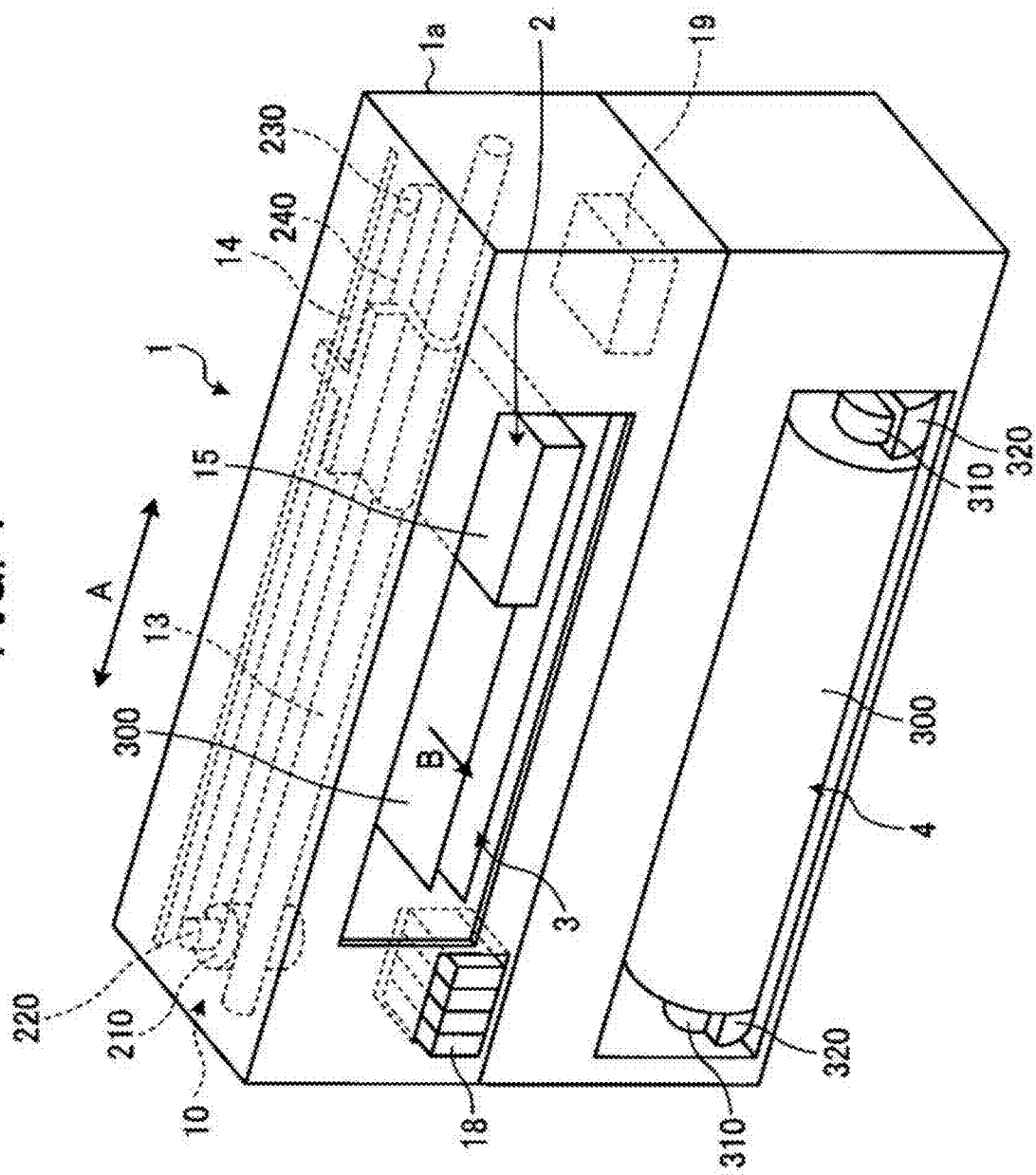
FIG. 1 is a diagram illustrating an example of an inkjet recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

For example, a method has been proposed which includes determining the gap between the ink discharging surface of the recording head and the recording medium conveyance surface of the platen and setting (correcting) the ink discharging timing based on the detection result.

According to the present disclosure, a liquid discharging device is provided which produces an image with good solid area wettability and reduces image density unevenness of the image.

Liquid Discharging Device and Liquid Discharging Method

The liquid discharging device of the present disclosure includes a carriage carrying a head configured to discharge a liquid onto a target (recording medium, typically sheet or paper), the liquid containing an ink, the ink containing water, an organic solvent, a coloring material, and a plurality of polysiloxane compounds, a driving unit configured to move the carriage and the target relatively to each other, a measuring unit configured to measure the distance between the carriage and the target, an image-capturing unit configured to capture a target image and a setting unit configured to set a liquid discharging performance of the head based on the measurement result obtained by the measuring unit and the target image obtained by the image-capturing unit. The ink may optionally further contain other components.

The liquid discharging method of the present disclosure includes a driving step of moving a carriage and a target relatively to each other, the carriage carrying a head configured to discharge a liquid onto the target, the liquid containing an ink, the ink containing water, an organic solvent, a coloring material, and a plurality of polysiloxane compounds, a step of measuring the distance between the carriage and the target, capturing a target image, and a step of setting a liquid discharging performance of the head based on the measurement result obtained by the measuring and the target image obtained by the capturing. The liquid discharging method may optionally further include other steps.

The liquid discharging device and the liquid discharging method according to the present disclosure are based on the knowledge that since captured images are not utilized in the related art, it is impossible to obtain sufficient image quality simply by setting the discharging timing based on the gap between the ink discharging surface of the recording head and the paper conveyance surface of the platen.

Carriage

The carriage carries a head configured to discharge a liquid onto a target.

An inkjet recording device serving as the liquid discharging device of the present disclosure is a serial-type inkjet recording device configured to form an image while scanning a carriage carrying a head in the width direction of paper and, upon completion of one or more scanning operations, convey the paper and form the next recording line.

Driving Step and Driving Unit

In the driving step, the carriage and the target are relatively moved to each other and the driving device executes the driving step.

The driving unit may be, for example, a motor control unit. The motor control unit can serve as a driving unit configured to move the carriage and the paper relatively to each other. Alternatively, a main-scanning motor or a sub-scanning motor can serve as a driving unit.

Measuring Step and Measuring Unit

In the measuring step, the distance between the carriage and the target is measured and the measuring unit executes the measuring step.

To improve the accuracy of the landing position of ink droplets, the measuring unit may be configured to measure the distance between the carriage and the target based on the captured image (target image).

Image-Capturing Step and Image-Capturing Unit

In the image-capturing step, an image of the target is captured and the image-capturing unit executes the image capturing step.

The image-capturing unit has no particular limit as long as it can acquire a captured image and can be suitably selected to suit to a particular application. For example, an image-capturing device illustrated in FIGS. 3 to 6 are suitable.

Setting Step and Setting Unit

In the setting step, the liquid discharging performance of the head is set based on the measurement result obtained by the measuring unit and the captured image obtained by the image-capturing unit and the setting unit executes the setting step.

The setting unit includes a first setting unit configured to set a liquid discharging timing of the head based on the measurement result obtained by the measuring unit and a second setting unit configured to reset the liquid discharging timing of the head or to set a droplet size based on a captured pattern image as the target image obtained by capturing a pattern image formed on the target after the first setting unit sets the liquid discharging timing of the head.

It is preferable that the pattern image be a particular color image with each pixel set to have equal density, and the second setting unit be configured to reset the liquid discharging timing of the head or to set the droplet size if the difference between the maximum density and the minimum density of the captured pattern image in the pattern image is greater than or equal to a threshold.

Other Processes and Other Devices

The other processes are not particularly limited and can be suitably selected to suit to a particular application. For example, a control process is selected.

The other devices are not particularly limited and can be suitably selected to suit to a particular application. For example, a control device is selected.

By the control process, each process is controlled and the control device suitably executes the control process.

There is no specific limit to the control device as long as the device can control the behavior of each device. Any control device can be suitably selected and used. For example, devices such as a sequencer and a computer can be used.

The liquid discharging device and the liquid discharging method of the present disclosure will be described in detail with reference to the accompanying drawings. In the present disclosure, the liquid discharging device includes a head configured to discharge a liquid and drive the head to discharge a liquid. The device to discharge a liquid includes not only a device capable of discharging the liquid onto a target (medium) to which the liquid is attachable but also a device that discharges the liquid into air or liquid. Examples of the liquid discharging device include, but are not limited to, an image-forming device, a solid freeform fabricating device, a processing-liquid applying device, and a spray granulating device.

As an example of the liquid discharging device, an inkjet recording device, which is a type of image-forming device, is described below. In the following description of the inkjet recording device, the ink (ink droplet) is an example of the liquid mentioned above, the recording head is an example of the head mentioned above, and the paper, which is an example of the recording medium, is an example of the target mentioned above.

FIG. 1 is a diagram illustrating the entire configuration of an inkjet recording device 1 according to this embodiment. The inkjet recording device 1 is a so-called serial-type inkjet recording device configured to form an image while scanning a carriage 15 carrying recording heads 16 (described later with reference to FIG. 2) in the width direction of a sheet (paper) and, upon completion of one or more scanning operations, convey the sheet and form the next recording line.

As illustrated in FIG. 1, the inkjet recording device 1 includes an image-forming unit 2, a sheet-conveying unit 3, and a roll-paper accommodating unit 4 that are disposed inside a device 1a. The image-forming unit 2 includes a guide rod 13 and a guide rail 14 extending between both side plates. The carriage 15 is supported by the guide rod 13 and the guide rail 14 so as to be slidable in the direction indicated by arrow A. The carriage 15 carries the recording heads 16 (FIG. 2), which are configured to discharge ink droplets of black (K), yellow (Y), magenta (M), and cyan (C).

A main-scanning mechanism 10 includes a carriage-driving motor 210 disposed on one side in the sheet width direction, a driving pulley 220 rotationally driven by the carriage-driving motor 210, a driven pulley 230 disposed on the other side in the sheet width direction, and a belt member 240 looped around the driving pulley 220 and the driven pulley 230. A tension is applied in a direction in which the driven pulley 230 is moved outward, that is, away from the driving pulley 220, by a tension spring, etc.

The belt member 240 is partially held by a belt holder disposed on the rear side of the carriage 15 to pull the carriage 15 in the sheet width direction. An encoder sheet is disposed in the sheet width direction of the carriage 15 to detect the main-scanning position of the carriage 15.

An encoder sensor disposed on the carriage 15 reads the encoder sheet to detect the main-scanning position of the carriage 15. In the main-scanning region of the carriage 15, the sheet-conveying unit 3 intermittently conveys roll paper 300 in a recording region in a direction orthogonal to the sheet width direction, that is, in the sheet conveyance direction (in the direction indicated by the arrow B in FIG. 1). A main cartridge 18 containing inks of individual colors for supply to the sub tanks of the recording heads 16 is detachably attached to the device 1a outside the carriage reciprocation region, or in a region outside one end of the main-scanning region, in the sheet width direction. A dummy ink receiver configured to receive ink droplets during dummy discharging, by which ink droplets that do not contribute to image recording are discharged to discharge any thickened ink, is disposed outside the other end of the carriage reciprocation region, that is, on the dummy discharging side (on the left in FIG. 1).

Each recording head 16 is configured to conduct dummy discharging at the dummy discharging position for maintenance and restoration of discharging performance when a predetermined condition is satisfied. In addition, a maintenance and restoration mechanism 19 for maintenance and restoration of the recording heads 16 is disposed outside on one end of the carriage reciprocation region, that is, on the carriage home position side (on the right in FIG. 1). The maintenance and restoration mechanism 19 includes caps for capping the nozzle surfaces of the recording heads 16 and a wiper blade serving as a blade member for wiping the nozzle surfaces.

In other configurations, depending on the device specifications, for example, the dummy ink receiver may be disposed on the carriage home position side and may be incorporated into the maintenance and restoration mechanism 19 together with the caps and the wiper blade. Alternatively, the dummy ink receiver may be disposed on each of the carriage home position side and the spitting position side.

The roll-paper accommodating unit 4, serving as a paper feeder, is configured such that the roll paper 300, serving as a sheet for image recording, is set in the roll-paper accommodating unit 4. Roll paper of different sizes in the sheet width direction can be set in the roll-paper accommodating unit 4.

Flanges 310 are mounted onto both ends of the shaft of the roll paper 300. The roll paper 300 is accommodated in the roll-paper accommodating unit 4 by placing the flanges 310 on flange receivers 320. Support rollers are disposed inside the flange receivers 320. The support rollers are disposed in contact with the outer surfaces of the flanges 310 so that the flanges 310 can be rotated to feed the roll paper 300 to a sheet conveyance path. However, the device configuration is not limited to the above configuration. Instead, a small serial-type inkjet printer for use with cut sheets may also be employed.

Figure 2:
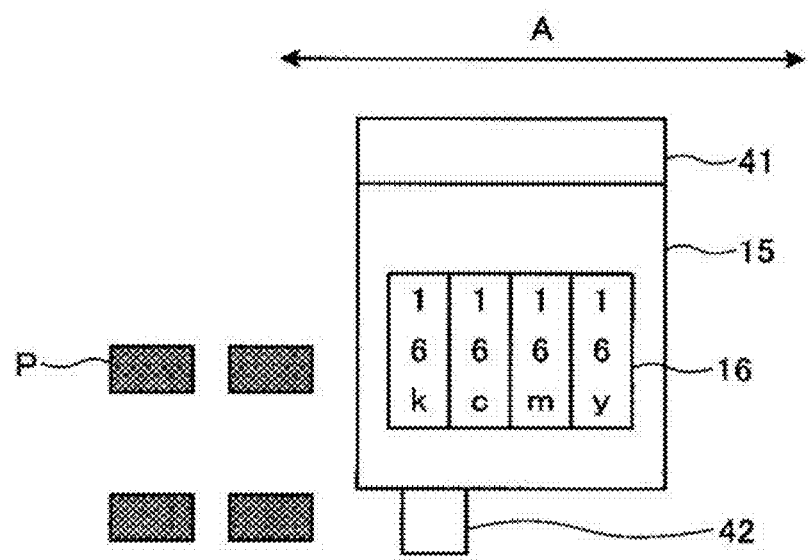
FIG. 2 is a diagram illustrating a top view of an example of a carriage.

FIG. 2 is a top view of the carriage 15. In FIG. 2, a gap-measuring unit 41, such as an optical-sensor-type displacement meter, measures the distance between the carriage 15 and a sheet (target). The measuring unit 41 measures the distance between the carriage 15 and the sheet at the same height as the discharging surfaces of the recording heads 16.

As illustrated in FIG. 2, the carriage 15 carries a recording head 16y configured to discharge a yellow (Y) ink, a recording head 16m configured to discharge a magenta (M) ink, a recording head 16c configured to discharge a cyan (C) ink, and a recording head 16k configured to discharge a black (K) ink. These are collectively referred to as recording heads 16.

As illustrated in FIG. 2, the carriage 15 supports an image-capturing device (an example of an image-capturing unit) 42 configured to capture a pattern image P printed on the sheet. As described in detail later, the ink discharging timing of the recording heads 16 is set depending on the gap measured by the gap-measuring unit 41, and an image of a print result after the setting is captured by the image-capturing device 42. If the quality is determined to be sufficient based on the captured image, the adjustment of the discharging performance of the recording heads 16 ends. Conversely, if the quality is determined to be insufficient, further adjustment is set. The capture of images by the image-capturing device 42 is not limited to the above sequence. For example, an image may be captured and checked for quality before the ink discharging timing is corrected depending on the gap. The relative position of the gap-measuring unit 41 and the image-capturing device 42 to the carriage 15 is also not limited to the example illustrated in FIG. 2.

Figure 3:
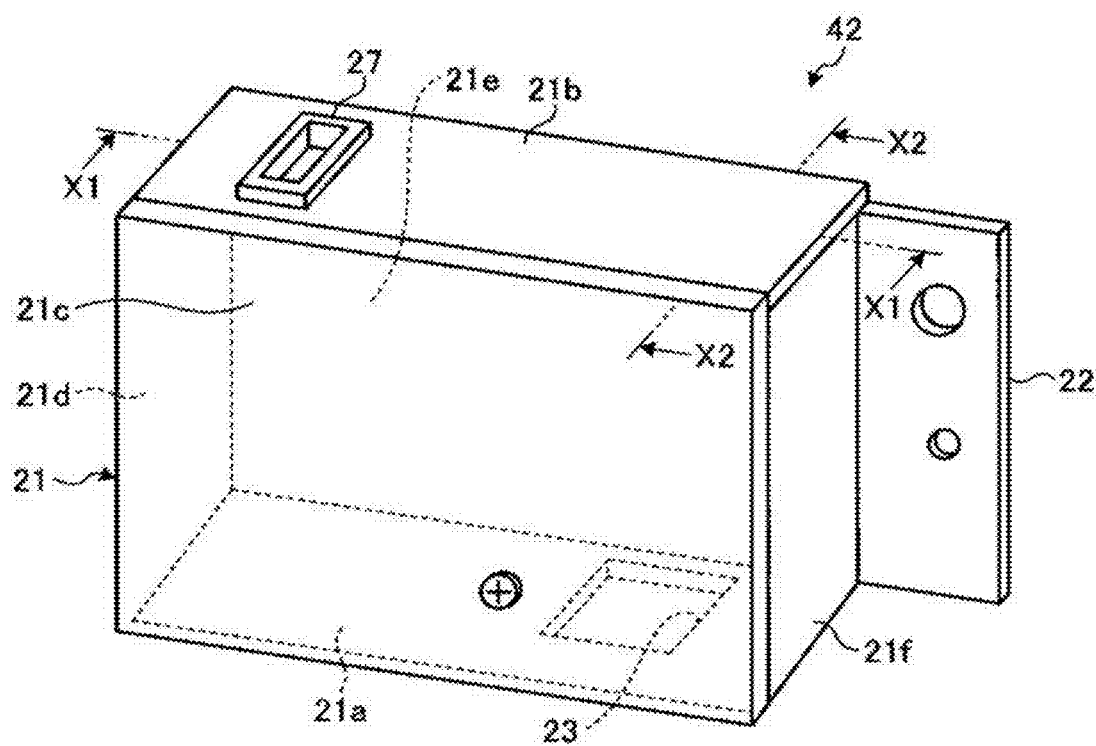
FIG. 3 is a diagram illustrating a perspective view of an example of the exterior of a recording device.
Figure 4:
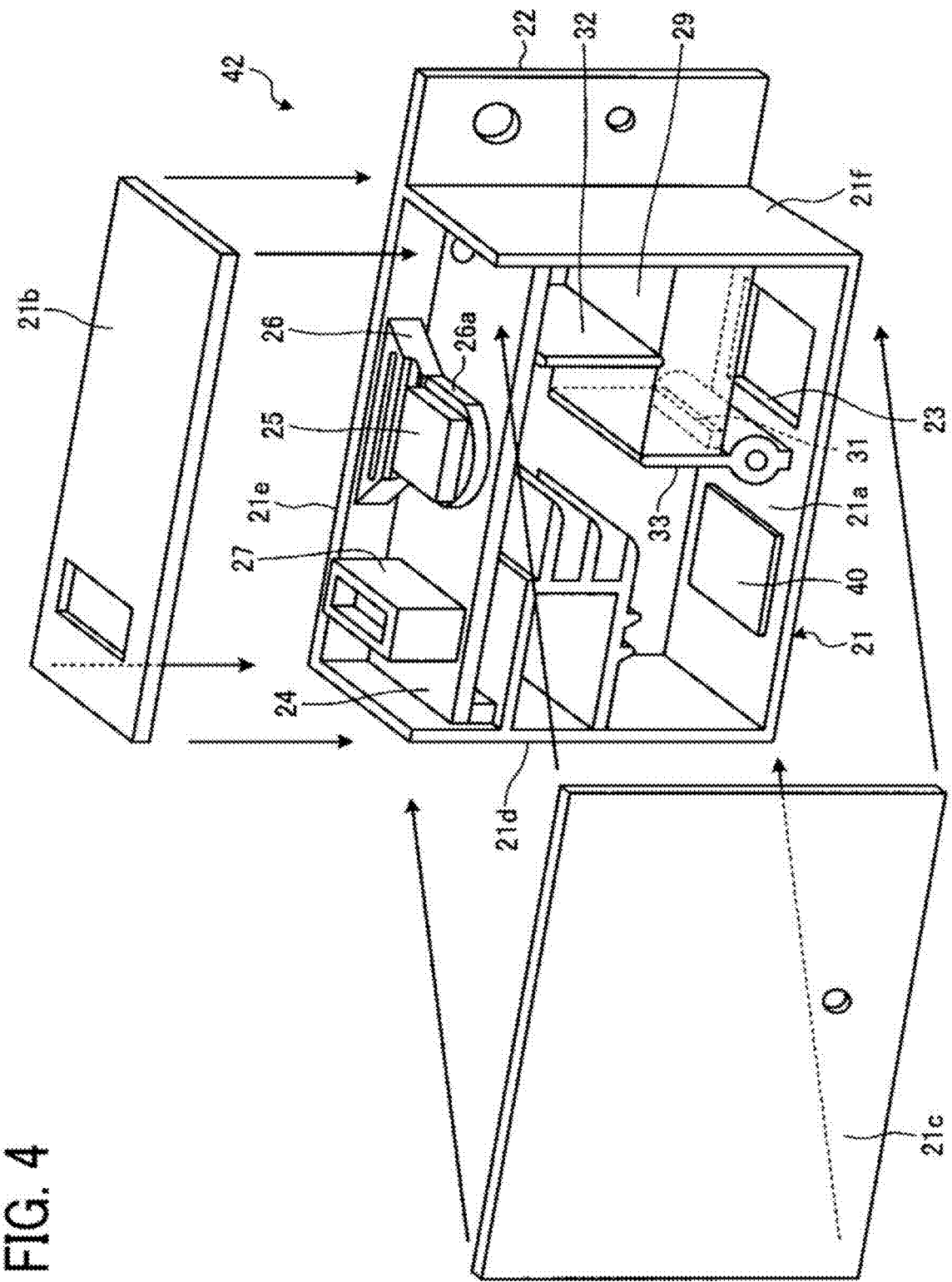
FIG. 4 is a diagram illustrating an exploded perspective view of an example of an image capturing device.
Figure 5:
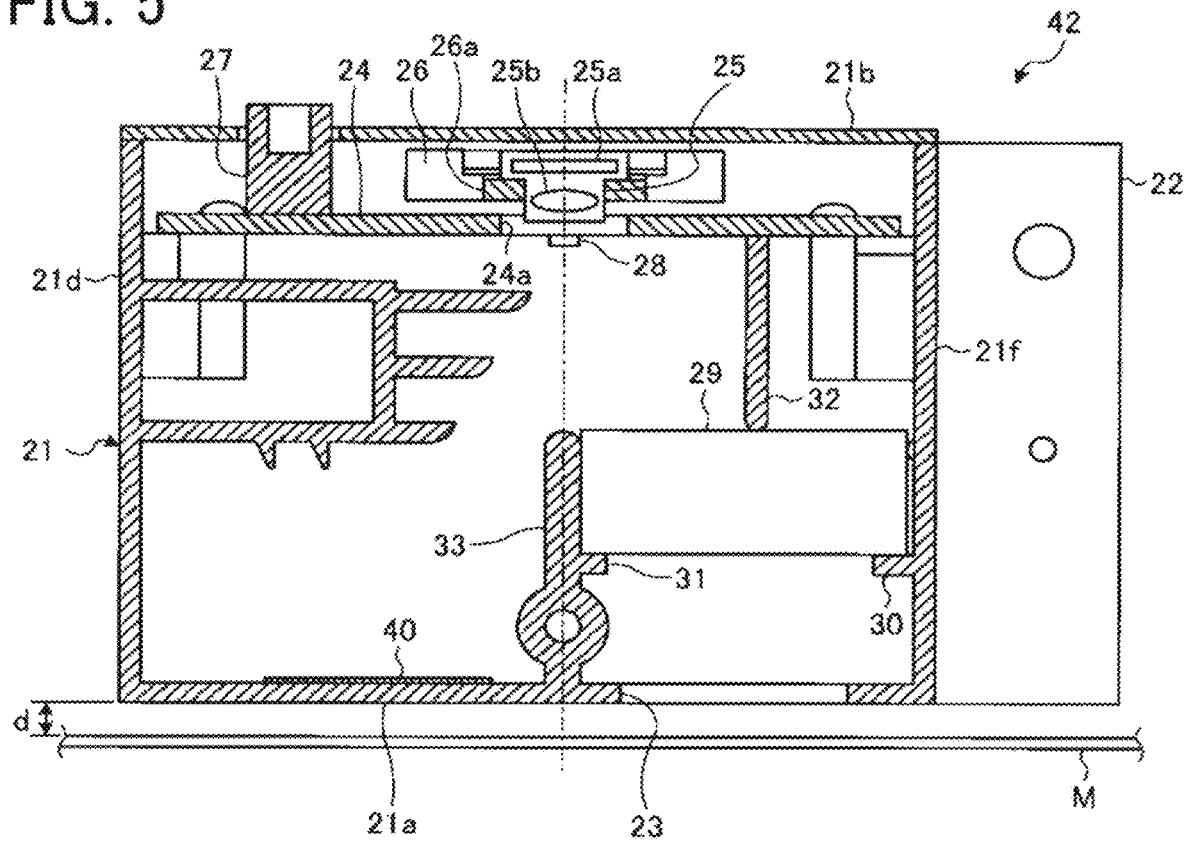
FIG. 5 is a diagram illustrating a longitudinal section of an example of an image-capturing device as viewed in the X1 direction in FIG. 3.
Figure 6:
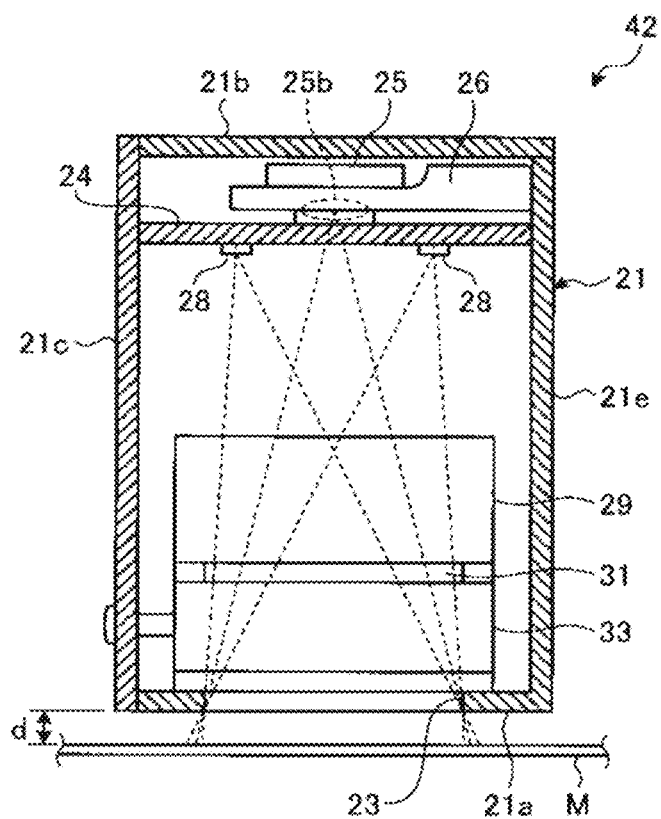
FIG. 6 is a diagram illustrating a longitudinal section of an example of an image-capturing device as viewed in the X2 direction in FIG. 3.

Next, an example of the mechanical configuration of the image-capturing device 42 according to this embodiment will be described with reference to FIGS. 3 to 6. FIG. 3 is a perspective view illustrating the exterior of the image-capturing device 42. FIG. 4 is an exploded perspective view of the image-capturing device 42. FIG. 5 is a longitudinal sectional view of the image-capturing device 42 as viewed in the X1 direction in FIG. 3. FIG. 6 is a longitudinal sectional view of the image-capturing device 42 as viewed in the X2 direction in FIG. 3.

As illustrated in FIGS. 3 and 4, the image-capturing device 42 includes a housing 21 integrally formed with a mounting tab 22. The housing 21 includes, for example, a bottom plate 21a and a top plate 21b that are disposed opposite each other spaced therebetween a predetermined distance and sidewalls 21c, 21d, 21e, and 21f joining the bottom plate 21a and the top plate 21b. The bottom plate 21a and the sidewalls 21d, 21e, and 21f of the housing 21 are integrally formed with the mounting tab 22, for example, by molding, whereas the top plate 21b and the sidewall 21c are detachable. In FIG. 4, the top plate 21b and the sidewall 21c are detached.

The image-capturing device 42 is mounted onto the carriage 15, for example, by bringing the sidewall 21e and the mounting tab 22 of the housing 21 into abutment with a side surface of the carriage 15 and fastening the housing 21 to the side surface of the carriage 15 with fasteners such as screws. As illustrated in FIGS. 5 and 6, the image-capturing device 42 is mounted onto the carriage 15 such that the bottom plate 21a of the housing 21 faces a sheet spaced therebetween a gap d in a substantially parallel manner. The size of the space d corresponds to the distance between a subject to be imaged by a sensor unit 25, described later, and the housing 21. This distance varies depending on, for example, the difference in sheet thickness and the irregularities in the surface of the platen that supports the sheet.

The bottom plate 21a of the housing 21, which faces a sheet, has an opening 23 through which an image of a subject outside the housing 21 (the pattern image P formed on the sheet when colorimetry is conducted on the pattern image P) can be captured from inside the housing 21. A reference chart 40 is disposed on the inner surface of the bottom plate 21a of the housing 21 so as to be adjacent to the opening 23 with a support member 33 therebetween. The sensor unit 25, described later, captures an image of the pattern image P together with an image of the reference chart 40 for colorimetry on the pattern image P and the acquisition of RGB values. The reference chart 40 will be described in detail later.

A circuit board 24 is disposed on the top plate 21b side inside the housing 21. The sensor unit 25, which is configured to capture an image, is disposed between the top plate 21b of the housing 21 and the circuit board 24. As illustrated in FIG. 5, the sensor unit 25 includes a two-dimensional image sensor 25a such as a charge-coupled device (CCD) sensor or a complementary metal-oxide-semiconductor (CMOS) sensor and a lens 25b configured to form an optical image within the image capture range of the sensor unit 25 on a light-receiving surface (image capture region) of the two-dimensional image sensor 25a.

The sensor unit 25 is held, for example, by a sensor holder 26 integrally formed with the sidewall 21e of the housing 21. The sensor holder 26 includes a ring portion 26a opposite a through-hole 24a formed in the circuit board 24. The ring portion 26a has a through-hole having the size corresponding to the outer shape of a protruding portion of the sensor unit 25 on the lens 25b side. The insertion of the protruding portion on the lens 25b side into the ring portion 26a of the sensor holder 26 allows the sensor unit 25 to be held by the sensor holder 26, with the lens 25b facing the bottom plate 21a of the housing 21 via the through-hole 24a in the circuit board 24.

The sensor unit 25 is positioned and held by the sensor holder 26 such that the optical axis indicated by the one-dot chain line in FIG. 5 is substantially perpendicular to the bottom plate 21a of the housing 21 and such that the image capture range covers the opening 23 and the reference chart 40, which is described later. This allows the sensor unit 25 to capture an image of a subject outside the housing 21 (the pattern image P formed on the sheet) via the opening 23 in a portion of the image capture range of the two-dimensional image sensor 25a and an image of the reference chart 40 disposed inside the housing 21 in another portion of the image capture range of the two-dimensional image sensor 25a.

The sensor unit 25 is electrically coupled to the circuit board 24, on which various electronic components are mounted, for example, via a flexible cable. The circuit board 24 also has an external connection connector 27 to which a connection cable for coupling the image-capturing device 42 to a main control board (FIG. 8, described later) of the inkjet recording device 1, which is described later, is provided.

Light sources 28 are also disposed inside the housing 21 to substantially uniformly illuminate the image capture range when the sensor unit 25 captures an image. The light sources 28 may be, for example, light-emitting diodes (LEDs). As illustrated in FIG. 6, the light sources 28 used in this embodiment are two LEDs arranged at equal distances from the center of the lens 25b of the sensor unit 25 in the direction orthogonal to the direction in which the opening 23 and the reference chart 40 are arranged side-by-side.

The two LEDs used as the light sources 28 are mounted, for example, on the surface of the circuit board 24 facing the bottom plate 21a. The light sources 28, however, need not necessarily be directly mounted on the circuit board 24, but may be disposed at any position where the image capture range of the sensor unit 25 can be substantially uniformly illuminated with diffuse light. Although LEDs are used as the light sources 28 in this embodiment, the type of light source 28 is not limited to LEDs. For example, organic electroluminescent (EL) devices may instead be used as the light sources 28. If organic EL devices are used as the light sources 28, illumination light having a spectral distribution close to the spectral distribution of sunlight can be obtained, which results in improved colorimetry accuracy.

An optical-path-length changing member 29 is also disposed inside the housing 21. The optical-path-length changing member 29 is disposed in an optical path between the sensor unit 25 and the subject outside the housing 21 (the pattern image P formed on the sheet) to be imaged through the opening 23 by the sensor unit 25. The optical-path-length changing member 29 is an optical element, with a refractive index n, that has sufficient transmittance for light from the light sources 28. The optical-path-length changing member 29 brings the plane where an optical image of the subject outside the housing 21 is formed closer to the plane where an optical image of the reference chart 40 inside the housing 21 is formed. That is, in the image-capturing device 42 according to this embodiment, the optical-path-length changing member 29 is disposed in the optical path between the sensor unit 25 and the subject outside the housing 21 to change the optical path length so that both the plane where an optical image of patches serving as the subject outside the housing 21 is formed and the plane where an optical image of the reference chart 40 inside the housing 21 is formed are positioned on the light-receiving surface of the two-dimensional image sensor 25a of the sensor unit 25. This allows the sensor unit 25 to capture focused images of both the subject outside the housing 21 and the reference chart 40 inside the housing 21.

For example, as illustrated in FIG. 5, the surface of the optical-path-length changing member 29 facing the bottom plate 21a is supported at both ends by a pair of ribs 30 and 31. A pressing member 32 is also disposed between the surface of the optical-path-length changing member 29 facing the top plate 21b and the circuit board 24 so that the optical-path-length changing member 29 is not movable inside the housing 21. The optical-path-length changing member 29, which is disposed so as to close the opening 23 in the bottom plate 21a of the housing 21, also prevents contaminants, such as ink mist and dust, entering the housing 21 from outside the housing 21 through the opening 23 from being deposited on, for example, the sensor unit 25, the light sources 28, or the reference chart 40.

For colorimetry on the pattern image P, the image-capturing device 42 according to this embodiment turns on the light sources 28 disposed inside the housing 21. While the pattern image P formed on the sheet outside the housing 21 is being illuminated with light from the light sources 28, the sensor unit 25 captures an image.

The above-described mechanical configuration of the image-capturing device 42 is merely illustrative and should not be construed as limiting. The image-capturing device 42 according to this embodiment may have at least a configuration in which the sensor unit 25 disposed inside the housing 21 captures an image of the subject outside the housing 21 through the opening 23 while the light sources 28 disposed inside the housing 21 remain on. Various changes and modifications can be made to the above configuration. For example, although the above image-capturing device 42 has the reference chart 40 disposed on the inner surface of the bottom plate 21a of the housing 21, the image-capturing device 42 may instead have a configuration in which the bottom plate 21a of the housing 21 has an opening different from the opening 23 at the position where the reference chart 40 is located and in which the reference chart 40 is attached outside the housing 21 at the position where the opening is disposed. In this case, the sensor unit 25 captures an image of the pattern image P formed on the sheet through the opening 23 and an image of the reference chart 40 attached outside the bottom plate 21a of the housing 21 through the opening different from the opening 23. This example has an advantage, which is that the reference chart 40 can be easily replaced when soiling or other problem occurs.

Figure 7:
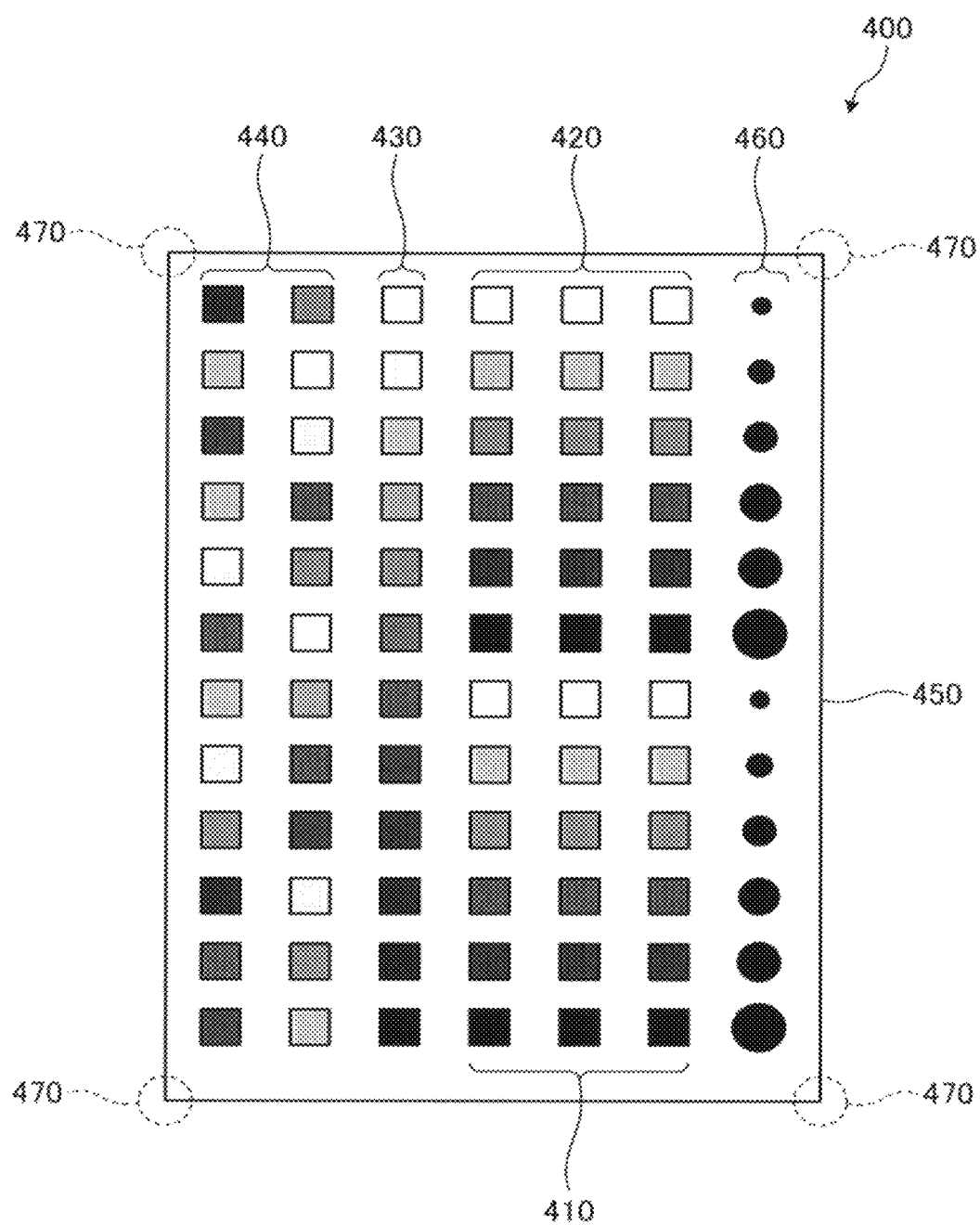
FIG. 7 is a diagram illustrating an example of a reference chart.

Next, a specific example of the reference chart 40 disposed in the housing 21 of the image-capturing device 42 will be described with reference to FIG. 7. FIG. 7 is a diagram illustrating a specific example of the reference chart 40.

The reference chart 40 illustrated in FIG. 7 includes a plurality of reference patch arrays 410 to 440 in which colorimetry reference patches are arranged, a dot size measurement pattern array 460, a distance measurement line 450, and chart position identification markers 470.

The reference patch arrays 410, 420, 430, and 440 respectively include a reference patch array 410 in which reference patches of YMCK primary colors are arranged in order of gradation, a reference patch array 420 in which reference patches of RGB secondary colors are arranged in order of gradation, a reference patch array 430 in which grayscale reference patches are arranged in order of gradation (grayscale pattern), and a reference patch array 440 in which reference patches of tertiary colors are arranged. The dot size measurement pattern array 460 is a geometric shape measurement pattern array in which circular patterns of different sizes are arranged in order of size and can be used for the measurement of the dot size of images printed on sheets.

The distance measurement line 450 is formed as a rectangular frame enclosing the plurality of reference patch arrays 410 to 440 and the dot size measurement pattern array 460. The chart position identification markers 470 are disposed at the four corners of the distance measurement line 450 and serves as markers for the identification of the positions of the individual reference patches. The position of the reference chart 40 and the positions of the individual reference patches and patterns can be identified by identifying the distance measurement line 450 and the chart position identification markers 470 at the four corners of the distance measurement line 450 from an image of the reference chart 40 captured by the sensor unit 25.

The individual reference patches constituting the reference patch arrays 410 to 440 of colorimetry are used as a color reference that reflects the image capture conditions of the image-capturing device 42. The configuration of the reference patch arrays 410 to 440 of colorimetry arranged in the reference chart 40 is not limited to the example illustrated in FIG. 7 and any reference patch array can be applied. For example, reference patches with which colors can be identified over as wide a color range as possible may be used. The reference patch array 410 of YMCK primary color and the reference patch array 430 of grayscale may include patches with the colorimetric values of the inks used for the inkjet recording device 1. The reference patch array 420 of RGB secondary color may include patches with colorimetric values that can be achieved with the inks used for the inkjet recording device 1. Reference color charts with predetermined colorimetric values, such as Japan Color, may also be used.

Although the reference chart 40 used in this embodiment includes reference patch arrays 410 to 440 with a common patch (color chart) shape, the reference chart 40 need not necessarily include such reference patch arrays 410 to 440. The reference chart 40 may have a configuration in which a plurality of colors that can be used for colorimetry are arranged such that their respective positions can be identified.

As described above, since the reference chart 40 is disposed on the inner surface of the bottom plate 21a of the housing 21 so as to be adjacent to the opening 23, the sensor unit 25 can simultaneously capture an image of the subject outside the housing 21 and an image of the reference chart 40. The simultaneous capture means acquiring a single frame of image data including an image of the subject outside the housing 21 and an image of the reference chart 40. That is, even if there are differences in the time for data acquisition between the individual pixels, an image of the subject outside the housing 21 and an image of the reference chart 40 are considered to be simultaneously captured if the image of the subject outside the housing 21 and the image of the reference chart 40 are acquired within a single frame of image data.

Figure 8:
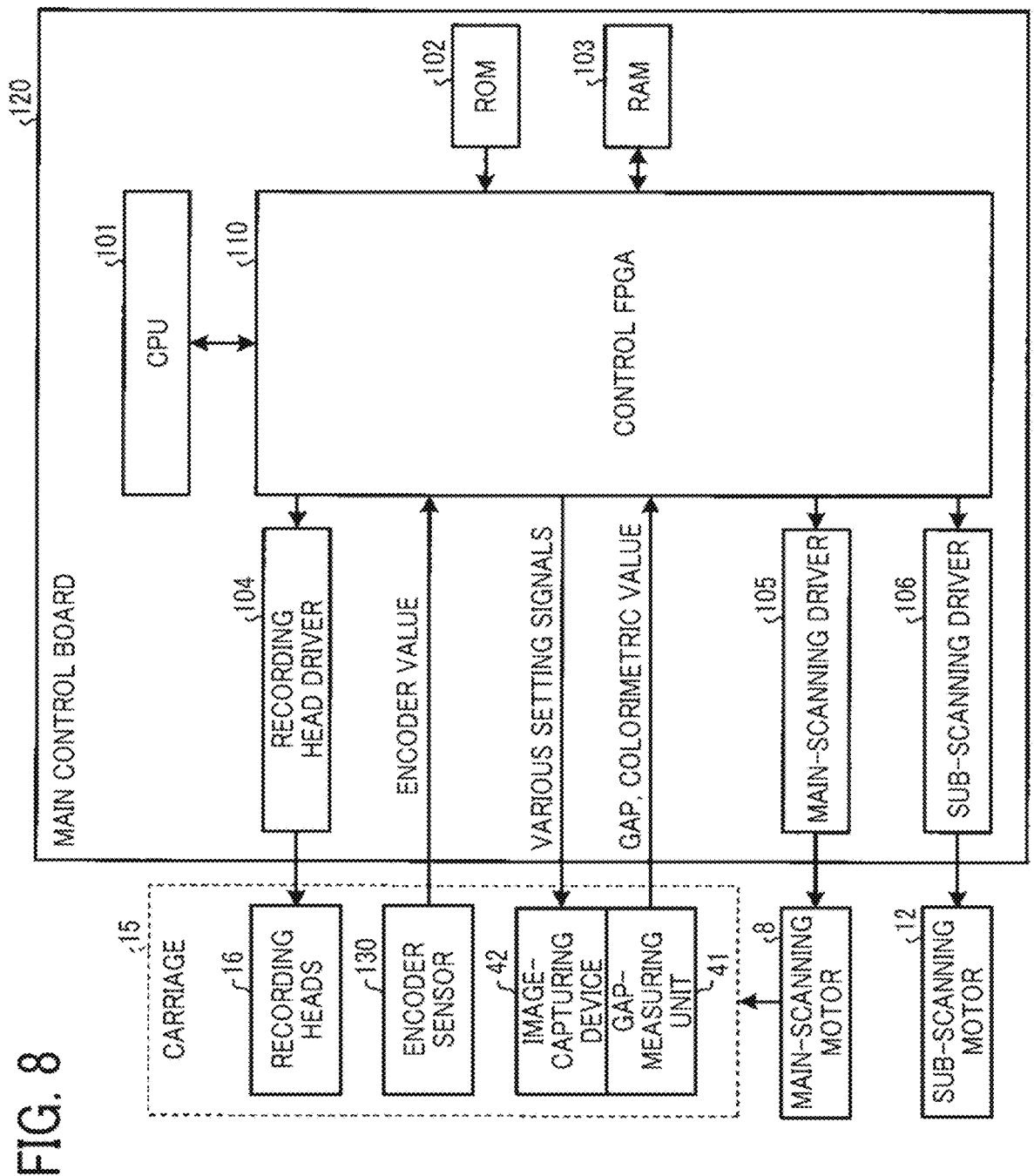
FIG. 8 is a block diagram illustrating an example of a control mechanism of an inkjet recording device.

Next, the configuration of the control mechanism of the inkjet recording device 1 according to this embodiment will be briefly described with reference to FIG. 8. FIG. 8 is a block diagram illustrating an example of the configuration of the control mechanism of the inkjet recording device 1.

As illustrated in FIG. 8, the inkjet recording device 1 according to this embodiment includes a central processing unit (CPU) 101, a read-only memory (ROM) 102, a random-access memory (RAM) 103, a recording head driver 104, a main-scanning driver 105, a sub-scanning driver 106, a control field-programmable gate array (FPGA) 110, the recording heads 16, the image-capturing device 42, an encoder sensor 130, a main-scanning motor 8, and a sub-scanning motor 12. The CPU 101, the ROM 102, the RANI 103, the recording head driver 104, the main-scanning driver 105, the sub-scanning driver 106, and the control FPGA 110 are mounted on the main control board. The recording heads 16, the encoder sensor 130, and the image-capturing device 42 are mounted on the carriage 15.

The CPU 101 is responsible for the overall control of the inkjet recording device 1. For example, the CPU 101 utilizes the RAM 103 as a workspace to execute various control programs stored in the ROM 102 and to output control commands for controlling various operations in the inkjet recording device 1.

The recording head driver 104, the main-scanning driver 105, and the sub-scanning driver 106 are respectively drivers for driving the recording head 16, the main-scanning motor 8, and the sub-scanning motor 12.

Figure 9:
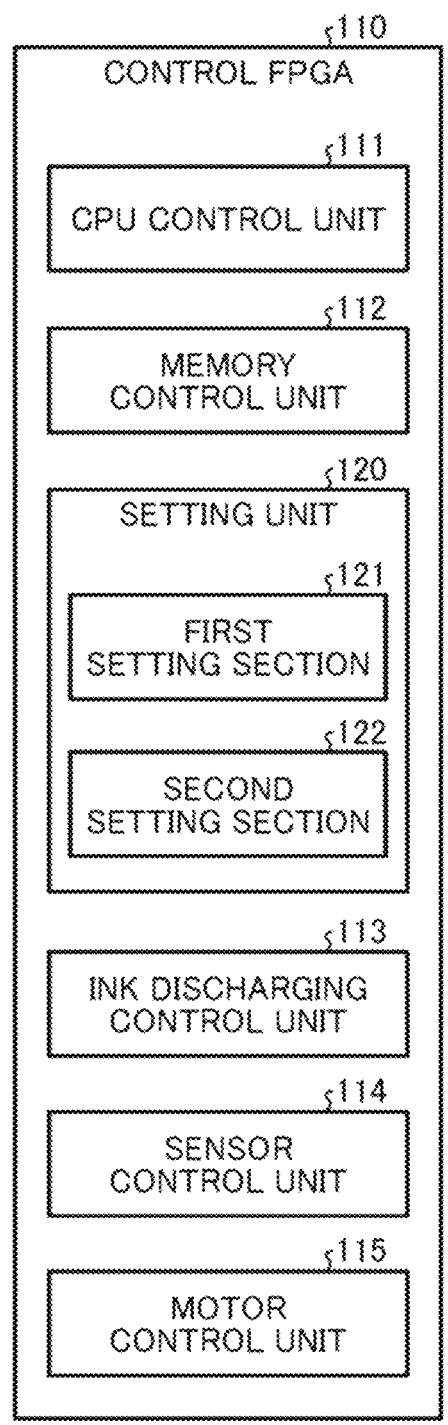
FIG. 9 is a diagram illustrating an example of functions of a control FPGA.

The control FPGA 110 cooperates with the CPU 101 to control various operations in the inkjet recording device 1. FIG. 9 illustrates example functions of the control FPGA 110. As illustrated in FIG. 9, the control FPGA 110 includes a CPU control unit 111, a memory control unit 112, a setting unit 120, an ink discharging control unit 113, a sensor control unit 114, and a motor control unit 115. For illustration purposes, the example in FIG. 9 illustrates the functions relating to the present disclosure. However, the functions of the control FPGA 110 are not limited to those.

The CPU control unit 111 communicates with the CPU 101 to transmit various information acquired by the control FPGA 110 to the CPU 101 and to receive control commands output from the CPU 101.

The memory control unit 112 executes memory control for the CPU 101 to access the ROM 102 and the RANI 103.

The setting unit 120 sets the ink discharging performance of the recording heads 16 based on the measurement result obtained by the gap-measuring unit 41 and a captured image obtained by the image-capturing device 42. The setting of the ink discharging performance is a concept including, for example, the setting of the ink discharging timing of the recording heads 16 and the setting of the ink droplet size. In this example, the setting unit 120 includes a first setting unit (section) 121 and a second setting unit (section) 122. The first setting unit 121 sets the ink discharging timing of the recording heads 16 based on the measurement result obtained by the gap-measuring unit 41. The second setting unit 122 resets the ink discharging timing of the recording heads 16 or sets the ink droplet size based on a captured pattern image that is a captured image obtained by capturing an image of the pattern image P formed on the sheet after the setting by the first setting unit 121. For example, the pattern image P is an image of a particular color with each pixel set to have equal density, and the second setting unit 122 resets the ink discharging timing of the recording heads 16 or sets the ink droplet size if the difference between the maximum density and the minimum density of the pattern image P in the captured pattern image is greater than or equal to a threshold. Further details will be described later. In this example, the setting unit 120 operates in response to control commands from the CPU 101.

The ink discharging control unit 113 controls the operation of the recording head driver 104 in response to control commands from the CPU 101 to control the ink discharging timing of the recording heads 16, which are driven by the recording head driver 104.

The sensor control unit 114 controls various sensors in response to control commands from the CPU 101. For example, the sensor control unit 114 processes sensor signals such as encoder values output from the encoder sensor 130. The sensor control unit 114 can also control the gap-measuring unit 41 to acquire the measurement result obtained by the gap-measuring unit 41. The sensor control unit 114 can also control the image-capturing device 42 to acquire the captured image obtained by the image-capturing device 42.

The motor control unit 115 controls the operation of the main-scanning driver 105 in response to control commands from the CPU 101 to control the main-scanning motor 8, which is driven by the main-scanning driver 105, thereby controlling the movement of the carriage 15 in the main-scanning direction. The motor control unit 115 also controls the operation of the sub-scanning driver 106 in response to control commands from the CPU 101 to control the sub-scanning motor 12, which is driven by the sub-scanning driver 106, thereby controlling the movement of the sheet in the sub-scanning direction. In this example, the motor control unit 115 can be considered to serve as a driving unit configured to move the carriage 15 and the sheet relative to each other. Alternatively, the main-scanning motor 8 or the sub-scanning motor 12 can be considered to serve as a driving unit.

The foregoing units are example control functions implemented by the control FPGA 110. Various other control functions may also be implemented by the control FPGA 110. Some or all of the above control functions may be implemented by programs executed by the CPU 101 or another general-purpose CPU. Some of the above control functions may also be implemented by another FPGA different from the control FPGA 110 or by dedicated hardware such as an application-specific integrated circuit (ASIC).

Referring back to FIG. 8, the description is continued. The recording heads 16 are driven by the recording head driver 104, whose operation is controlled by the CPU 101 and the control FPGA 110, to discharge ink onto a sheet and thereby form an image.

The encoder sensor 130 detects marks on the encoder sheet and outputs the resulting encoder values to the control FPGA 110. These encoder values are transmitted from the control FPGA 110 to the CPU 101 and are used, for example, to calculate the position and speed of the carriage 15. Based on the position and speed of the carriage 15 calculated from the encoder values, the CPU 101 generates and outputs a control command for the control of the main-scanning motor 8.

As described above, the gap-measuring unit 41 includes, for example, an optical-sensor-type displacement meter and measures the distance between the carriage 15 and the sheet. The measurement result obtained by the gap-measuring unit 41 is transmitted to the CPU 101 via the control FPGA 110.

For the adjustment of the ink discharging performance of the inkjet recording device 1, the sensor unit 25 captures an image of the pattern image P formed on the sheet together with an image of the reference chart 40. The image-capturing device 42 then calculates the colorimetric values (color coordinates in a standard color space, e.g., $L^*a^*b^*$ values in the L*a*b* color space) of the pattern image P based on the RGB values of the pattern image P obtained from the captured image and the RGB values of the individual reference patches of the reference chart 40 obtained from the captured image. The colorimetric values of the pattern image P calculated by the image-capturing device 42 are transmitted to the CPU 101 via the control FPGA 110. As a specific example of a method for calculating the colorimetric values of the pattern image P, the method disclosed in JP-2013-051671-A can be employed.

FIG. 10 is a table illustrating a setting method for the first setting unit 121. The example in FIG. 10 illustrates how much the discharging timing is corrected depending on the gap measured by the gap-measuring unit 41 for an ink discharging speed of 10 m/s and a target gap of 1.0 mm (the values in the rightmost column in FIG. 10 are correction values). By setting (correcting) the discharging timing in this manner, the landing position of ink on the sheet can be controlled to the target position when the gap varies.

Figure 11A:
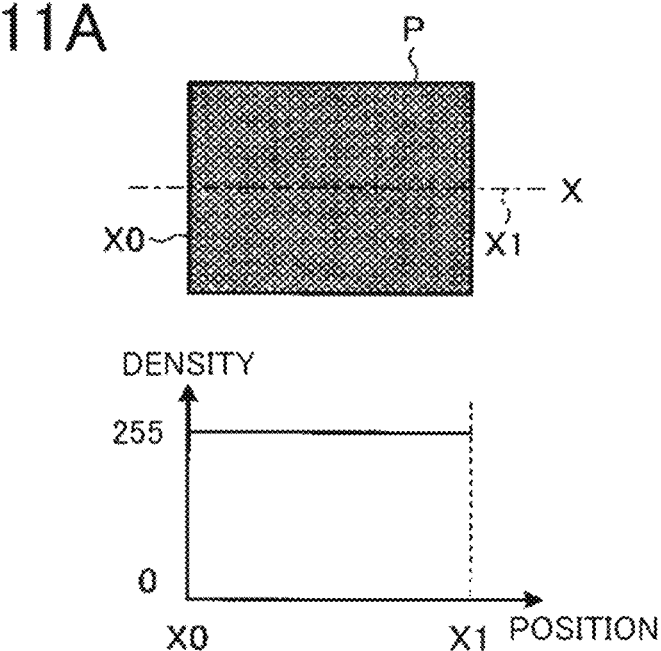
FIGS. 11A and 11B are diagrams illustrating an example of a setting method for a second setting unit.
Figure 11B:
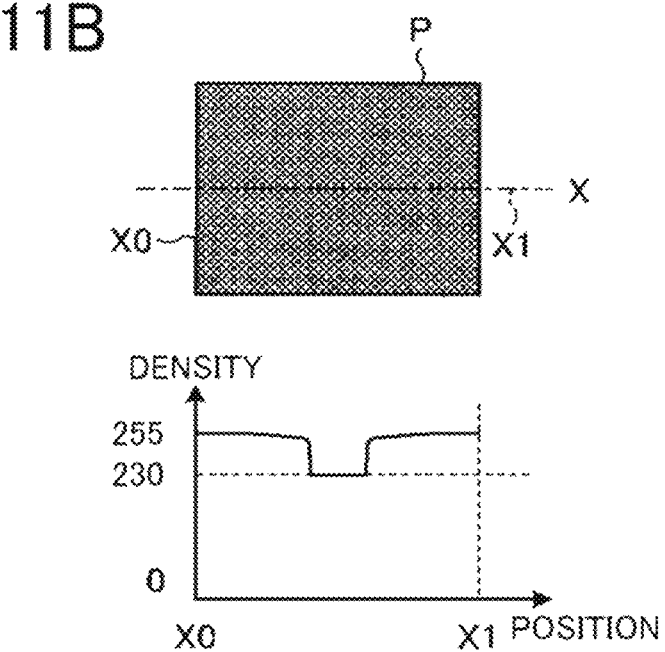

FIGS. 11A and 11B are diagrams illustrating a setting method by the second setting unit 122. The images on the upper side of FIGS. 11A and 11B are pattern images P (solid images) printed on sheets. The image-capturing device 42 captures images of these pattern images P and executes colorimetry between X0 and X1 in the X direction in FIGS. 11A and 11B. The graphs on the lower side compare the results (image density) with the pattern images P on the upper side. In the graphs, the density is expressed in 256 levels from 0 (light) to 255 (dark). In FIG. 11A, the density is constant at "255", which indicates stable quality. Therefore, the second setting unit 122 need not execute setting (additional correction), and the adjustment ends. In contrast, the density in FIG. 11B drops locally to "230", and it is determined that the second setting unit 122 needs to execute setting. As described above, the second setting unit 122 executes setting by changing (increasing) the droplet size or correcting the discharging timing again. After the setting by the second setting unit 122 is complete, the image-capturing device 42 executes image capture and colorimetry again, followed by the above-mentioned determination. The foregoing process is repeated until stable quality is achieved. The determination may be made by acquiring the difference between the maximum image density and the minimum image density and determining whether or not the difference is greater than or equal to a threshold. The determination may also be made in combination with the width over which the threshold is exceeded (in the X direction).

FIG. 12 is a flowchart illustrating example control in this embodiment. As illustrated in FIG. 12, the adjustment of the ink discharging performance starts when the gap-measuring unit 41 measures the gap between the carriage 15 and a sheet (step S1). Thereafter, the first setting unit 121 sets the ink discharging timing of the recording heads 16 based on the measurement result obtained in step S1 (step S2). Thereafter, the CPU 101 controls the control FPGA 110 to form a pattern image P on the sheet (step S3). Thereafter, the CPU 101 controls the image-capturing device 42 and the control FPGA 110 to capture an image of the pattern image P formed on the sheet (step S4). In the following description, a captured image obtained by capturing an image of the pattern image P formed on the sheet after the setting in step S2 may be referred to as "captured pattern image".

Thereafter, the second setting unit 122 determines whether or not the difference between the maximum density and the minimum density of the pattern image P in the captured pattern image is greater than or equal to the threshold (step S5). If the result in step S5 is negative (No in step S5), the process ends. Otherwise, if the result in step S5 is affirmative (Yes in step S5), the second setting unit 122 resets the ink discharging timing of the recording heads 16 or sets the ink droplet size so as to eliminate the difference in image density (the difference subjected to the determination in step S5) (step S6). After step S6, the CPU 101 controls the control FPGA 110 to form the pattern image P on a sheet again (step S7) and repeats step S4 and the subsequent process.

Figure 13:
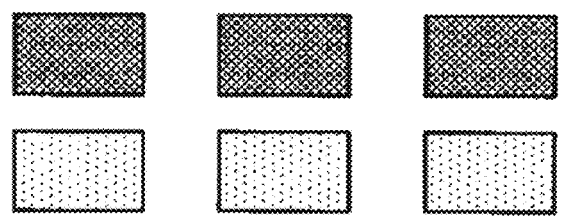
FIG. 13 is a diagram illustrating an example of a pattern image.

FIG. 13 illustrates an example of the pattern image P. The pattern image P in FIG. 13, serving as an adjustment pattern, includes two types of images, i.e., solid images and halftone images. By capturing images of these two types of images to acquire image information, more suitable setting can be conducted. For example, there may be cases where, although there is no problem with the quality of solid images, uneven density occurs in halftone images due to, for example, different droplet arrangements. If the above pattern is used in such cases, it can be determined that the second setting unit 122 needs to execute setting, thereby ensuring stable quality.

As described above, according to this embodiment, the ink discharging performance of the recording heads 16 is set based on the measurement result (the gap between the carriage 15 and the sheet) obtained by the gap-measuring unit 41 and the captured image obtained by the image-capturing device 42, thereby providing sufficient image quality as compared to related-art configurations in which the ink discharging performance is set based on the gap alone.

Although one embodiment of the present disclosure has been described above, the present disclosure is not limited to the foregoing embodiment. The present disclosure, when practiced, may be embodied with modifications to the elements without departing from the spirit of the invention. In addition, various embodiments can be made from suitable combinations of the plurality of elements disclosed in the foregoing embodiment. For example, some of the elements illustrated in the embodiment may be omitted.

For example, the image-capturing device 42 may have the function of the gap-measuring unit 41. That is, a measuring unit configured to measure the distance (gap) between the carriage 15 and the sheet (in this example, the image-capturing device 42) may measure the distance between the carriage 15 and the sheet based on a captured image.

Figure 14:
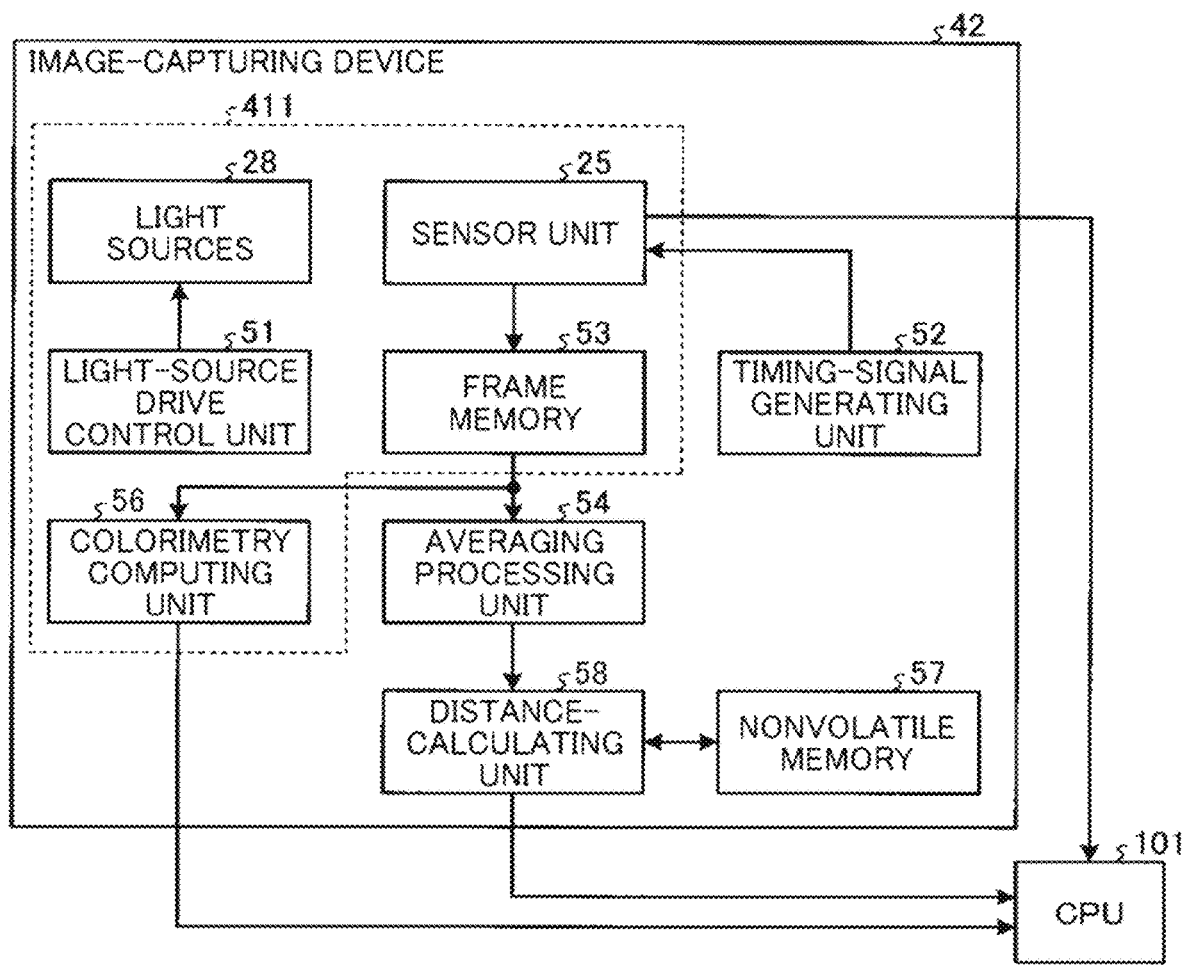
FIG. 14 is a diagram illustrating an example of functions of an image-capturing device according to a variation embodiment.

The functions of the image-capturing device 42 according to this modification will now be described with reference to FIG. 14. FIG. 14 is a block diagram illustrating example functions of the image-capturing device 42 according to this modification.

As illustrated in FIG. 14, in addition to the sensor unit 25 and the light sources 28 described above, the image-capturing device 42 includes a light-source drive control unit 51, a timing-signal generating unit 52, a frame memory 53, an averaging processing unit 54, a colorimetry computing unit 56, a nonvolatile memory 57, and a distance-calculating unit 58. These units are implemented, for example, by a computer system including a processor and a memory or by dedicated hardware such as an FPGA or an ASIC. The hardware for implementing the functions of these units is mounted on, for example, the circuit board 24 disposed inside the housing 21 of the image-capturing device 42.

The sensor unit 25 converts light incident through the lens 25b into an electrical signal on the two-dimensional image sensor 25a to output image data for the image capture range illuminated by the light sources 28. The sensor unit 25 incorporates the function of converting an analog signal obtained by photoelectric conversion on the two-dimensional image sensor 25a into digital image data by analog-to-digital (AD) conversion and outputting the image data after executing various image processing operations such as shading correction, white balance correction, γ correction, and image data format conversion. The various operating conditions of the two-dimensional image sensor 25a are set according to various setting signals from the CPU 101. Some or all of the various image processing operations on the image data may be executed outside the sensor unit 25.

When the sensor unit 25 captures an image, the light-source drive control unit 51 generates a light-source drive signal for turning on the light sources 28 and supplies the light-source drive signal to the light sources 28.

The timing-signal generating unit 52 generates a timing signal for controlling the timing when the sensor unit 25 starts image capture and supplies the timing signal to the sensor unit 25. In this example, the timing-signal generating unit 52 operates under the control of the sensor control unit 114 (CPU 101).

The frame memory 53 temporarily stores the image output from the sensor unit 25.

When colorimetry is performed on the pattern image P, the averaging processing unit 54 extracts an image region delimited by the opening 23 of the housing 21 (this image region is hereinafter referred to as "subject image region") and an image region depicting the reference chart 40 (this image region is hereinafter referred to as "reference chart image region") from the image output from the sensor unit 25 and temporarily stored in the frame memory 53. Thereafter, the averaging processing unit 54 averages the image data for a region of predetermined size in the center of the subject image region and outputs the resulting values as the RGB values of the pattern image P. The averaging processing unit 54 also averages the image data for the individual reference patch regions in the reference chart image region and outputs the resulting values as the RGB values of the individual reference patches. The RGB values of the pattern image P are passed to the colorimetry computing unit 56. The RGB values of the pattern image P may be corrected depending on the distance calculated by the distance-calculating unit 58 before being passed to the colorimetry computing unit 56, as in Japanese Patent Application No. 2016-083877 (JP-2017-35702017-A). In this case, the RGB values of the individual reference patches of the reference chart 40 are passed to the colorimetry computing unit 56 without correction depending on the distance calculated by the distance-calculating unit 58.

The colorimetry computing unit 56 calculates the colorimetric values of the pattern image P based on the RGB values of the pattern image P and the RGB values of the individual reference patches of the reference chart 40. The colorimetric values of the pattern image P calculated by the colorimetry computing unit 56 are transmitted to the CPU 101 on the main control board. For example, the colorimetry computing unit 56 can calculate the colorimetric values of the pattern image P by a method disclosed in JP-2013-051671-A; therefore, a detailed description of the processing executed by the colorimetry computing unit 56 is omitted herein.

The nonvolatile memory 57 stores, for example, various types of data used when the colorimetry computing unit 56 calculates the colorimetric values of the pattern image P.

Although the reference chart 40 is used to calculate the colorimetric values of the pattern image P, a reference chart need not necessarily be used if, for example, reference data is stored in advance in a memory such as the nonvolatile memory 57.

The distance-calculating unit 58 analyzes the image captured by the sensor unit 25 and temporarily stored in the frame memory 53 to calculate the distance between the housing 21 and the subject outside the housing 21, more specifically, the distance between the bottom plate 21a of the housing 21 and the sheet on which the pattern image P has been formed (the size of the space d illustrated in FIGS. 5 and 6). In this example, the placement of the image-capturing device 42 is designed so that the space d corresponds to the gap between the carriage 15 and the sheet.

In this example, the light sources 28, the sensor unit 25, the light-source drive control unit 51, the frame memory 53, and the distance-calculating unit 58 have the function of a gap-measuring unit 411 (which is similar to the function of the gap-measuring unit 41 described above). That is, the section surrounded by the dotted line in FIG. 14 has the function of the gap-measuring unit 411. Alternatively, some of the functions of the gap-measuring unit 411 may be mounted on the CPU 101. For example, some of the processing operations executed by the "distance-calculating unit 58" may be executed by the CPU 101.

Figure 15:
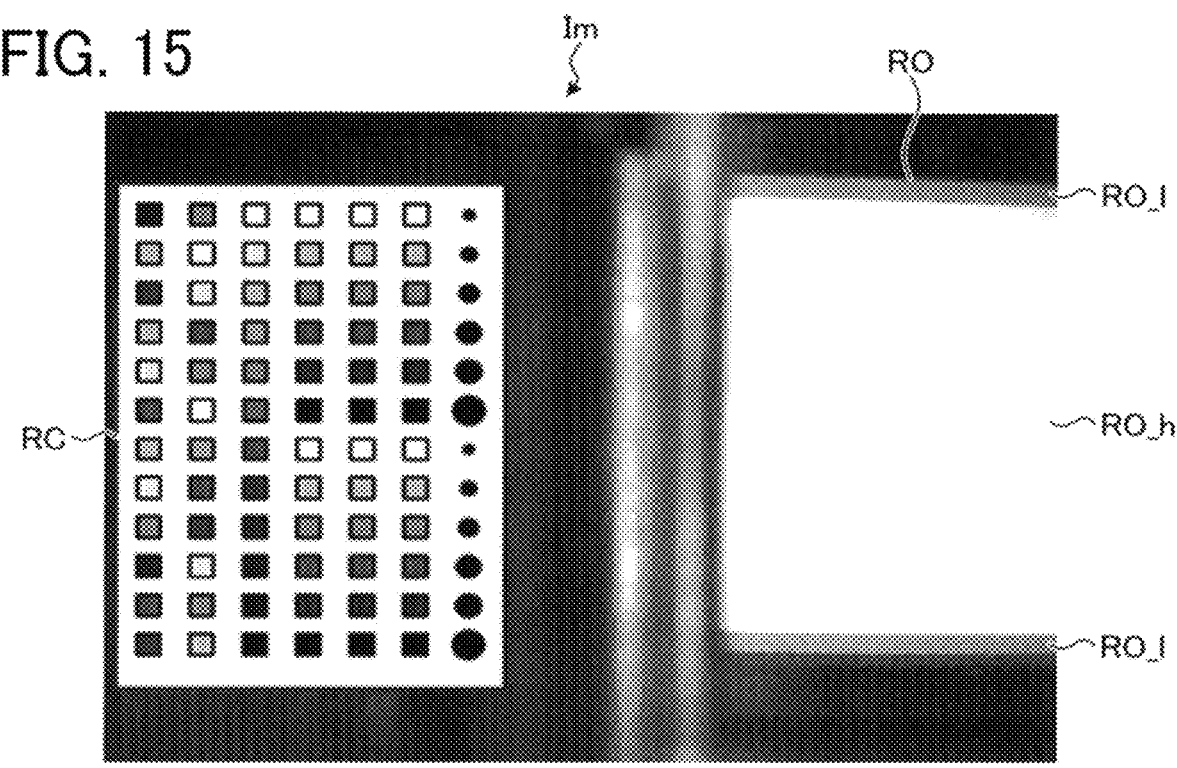
FIG. 15 is a diagram illustrating an example of an image captured by a sensor unit.
Figure 16:
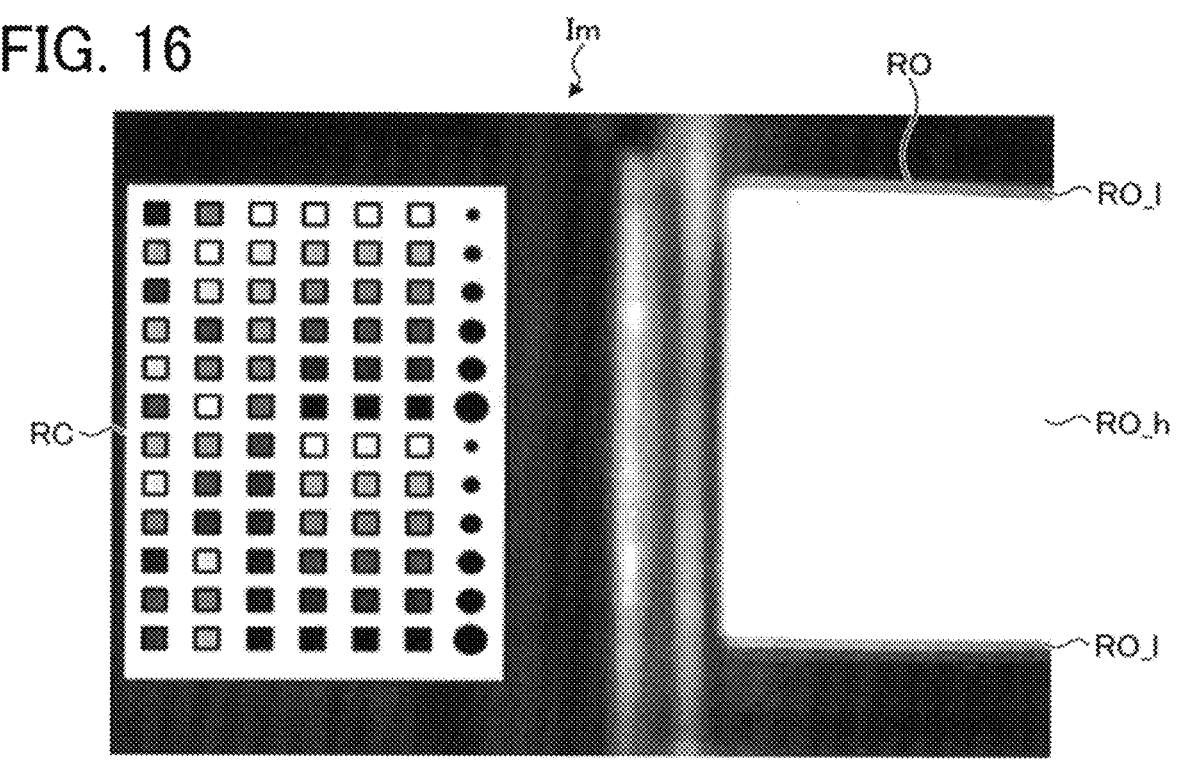
FIG. 16 is a diagram illustrating another example of an image captured by a sensor unit.
Figure 17:
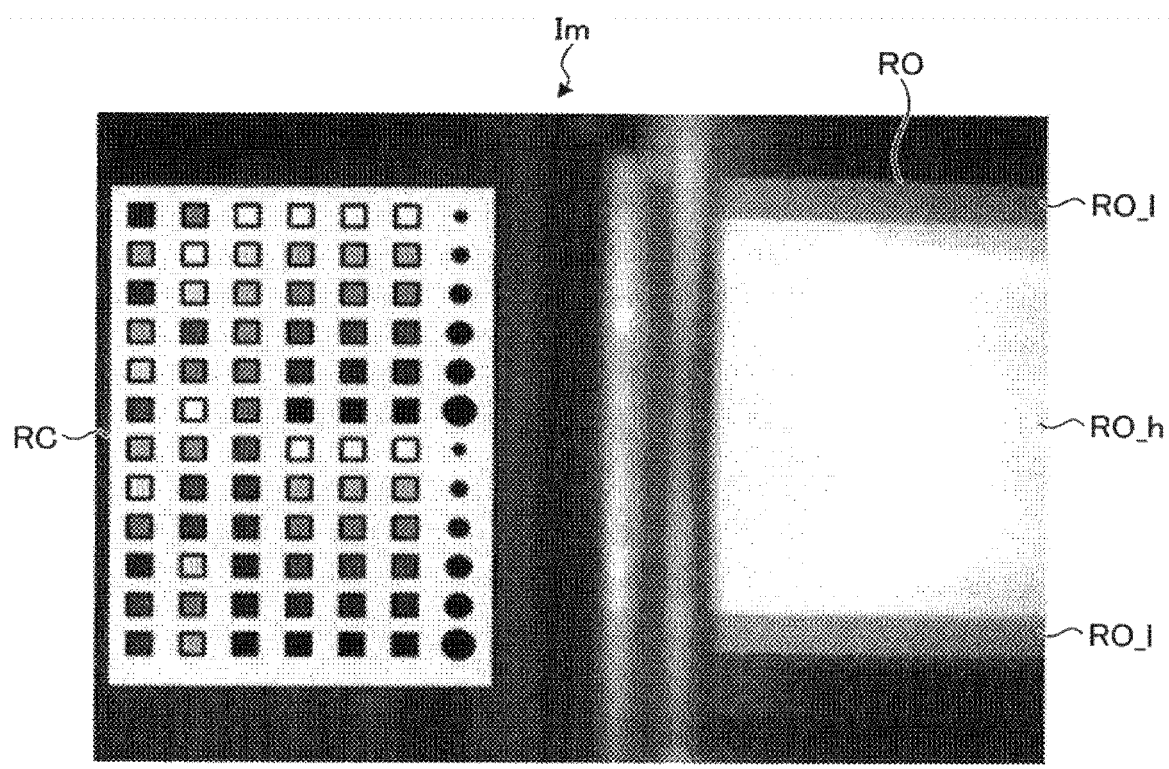
FIG. 17 is a diagram illustrating another example of an image captured by a sensor unit.

FIGS. 15 to 17 illustrate example images captured by the sensor unit 25. The images captured by the sensor unit 25 in FIGS. 15 to 17 are images in which the subject is a surface of a sheet on which no pattern image P is formed.

As illustrated in FIGS. 15 to 17, each image Im captured by the sensor unit 25 includes a reference chart image region RC that is an image region depicting the reference chart 40 inside the housing 21 and a subject image region RO that is an image region depicting the subject outside the housing 21 through the opening 23 of the housing 21, that is, an image region delimited by the opening 23 of the housing 21. The subject image region RO includes a high-brightness region RO_h that exhibits high brightness and low-brightness regions RO_l that exhibit low brightness. The low-brightness regions RO_l appear in stripes outside the high-brightness region RO_h (i.e., outside the high-brightness region RO_h in the direction orthogonal to the direction in which the reference chart 40 and the opening 23 are arranged side-by-side; in the examples in FIGS. 15 to 17, above and below the high-brightness region RO_h).

In each image lm captured by the sensor unit 25, the low-brightness regions RO_l appear outside the high-brightness region RO_h in the subject image region RO because there are regions that are not illuminated with light from one of the two light sources 28 outside the range where an image of the subject outside the housing 21 is captured by the sensor unit 25 due to the difference in the positional relationship of the sensor unit 25 and the light sources 28 with the opening 23 of the housing 21. The size of the subject image region RO in each image Im captured by the sensor unit 25 does not vary because the sensor unit 25 and the light sources 28 are fixedly disposed in the housing 21, which has the opening 23. However, the ratio of the size of the low-brightness regions RO_l to the size of the high-brightness region RO_h in the subject image region RO vary depending on the distance between the housing 21 and the subject outside the housing 21.

The image Im illustrated in FIG. 16 is an example image captured by the sensor unit 25 at a distance between the housing 21 and the subject outside the housing 21 (sheet surface) shorter than the image Im illustrated in FIG. 15. As seen in the comparison between the image Im illustrated in FIG. 15 and the image Im illustrated in FIG. 16, as the distance between the housing 21 and the subject outside the housing 21 decreases, the ratio of the size of the low-brightness regions RO_1 to the size of the high-brightness region RO_h in the subject image region RO becomes small.

The image Im illustrated in FIG. 17 is an example image captured by the sensor unit 25 at a distance between the housing 21 and the subject outside the housing 21 (sheet surface) larger than the image Im illustrated in FIG. 15. As seen in the comparison between the image Im illustrated in FIG. 17 and the image Im illustrated in FIG. 15, as the distance between the housing 21 and the subject outside the housing 21 increases, the ratio of the size of the low-brightness regions RO_1 to the size of the high-brightness region RO_h in the subject image region RO becomes large.

However, the ratio of the size of the low-brightness regions RO_1 to the size of the high-brightness region RO_h in the subject image region RO vary depending on the distance between the housing 21 and the subject outside the housing 21. Therefore, the distance between the housing 21 and the subject outside the housing 21 can be calculated by determining the ratio of the size of the low-brightness regions RO_1 to the size of the high-brightness region RO_h in the subject image region RO.

The distance-calculating unit 58 calculates the distance between the housing 21 and the subject outside the housing 21, for example, by the following method. Specifically, the distance-calculating unit 58 first extracts the subject image region RO from the image Im captured by the sensor unit 25 and temporarily stored in the frame memory 53. Thereafter, the distance-calculating unit 58 executes, for example, binarization processing with a predetermined threshold on the extracted subject image region RO to generate a binary image in which white pixels represent the high-brightness region RO_h and black pixels represent the low-brightness regions RO_1 in the subject image region RO.

Thereafter, the distance-calculating unit 58 counts the number of white pixels and the number of black pixels in the resulting binary image in the direction orthogonal to the direction in which the reference chart image region RC and the subject image region RO are arranged side-by-side in the image Im and calculates the proportion of the number of black pixels relative to the number of white pixels as the ratio of the size of the low-brightness regions RO_1 to the size of the high-brightness region RO_h. As described above, the two light sources 28 of the image-capturing device 42 according to this embodiment are arranged at equal distances from the center of the lens 25b of the sensor unit 25 in the direction orthogonal to the direction in which the opening 23 and the reference chart 40 are arranged side-by-side. Thereafter, if there is no relative tilt between the housing 21 and the subject, more specifically, if the bottom plate 21a of the housing 21 and the surface of the sheet on which the pattern image P has been formed are parallel to each other, the low-brightness regions RO_1 in the subject image region RO appear in uniform size on both sides of the high-brightness region RO_h in the direction orthogonal to the direction in which the reference chart image region RC and the subject image region RO are arranged side-by-side in the image Im. Therefore, the number of white pixels and the number of black pixels may be counted in half the size of the subject image region RO, that is, in the direction from the center of the subject image region RO toward one of the low-brightness regions RO_1.

After the distance-calculating unit 58 calculates the ratio of the size of the low-brightness regions RO_1 to the size of the high-brightness region RO_h in the subject image region RO in the manner described above, the distance-calculating unit 58 calculates the distance between the housing 21 and the subject outside the housing 21 based on the resulting ratio. There are three methods for calculating the distance between the housing 21 and the subject outside the housing 21 from the ratio of the size of the low-brightness regions RO_1 to the size of the high-brightness region RO_h in the subject image region RO, depending on the positional relationship of the light sources 28 with the opening 23 of the housing 21. These three calculation methods will hereinafter be described separately.

First Distance Calculation Method

Figure 18:
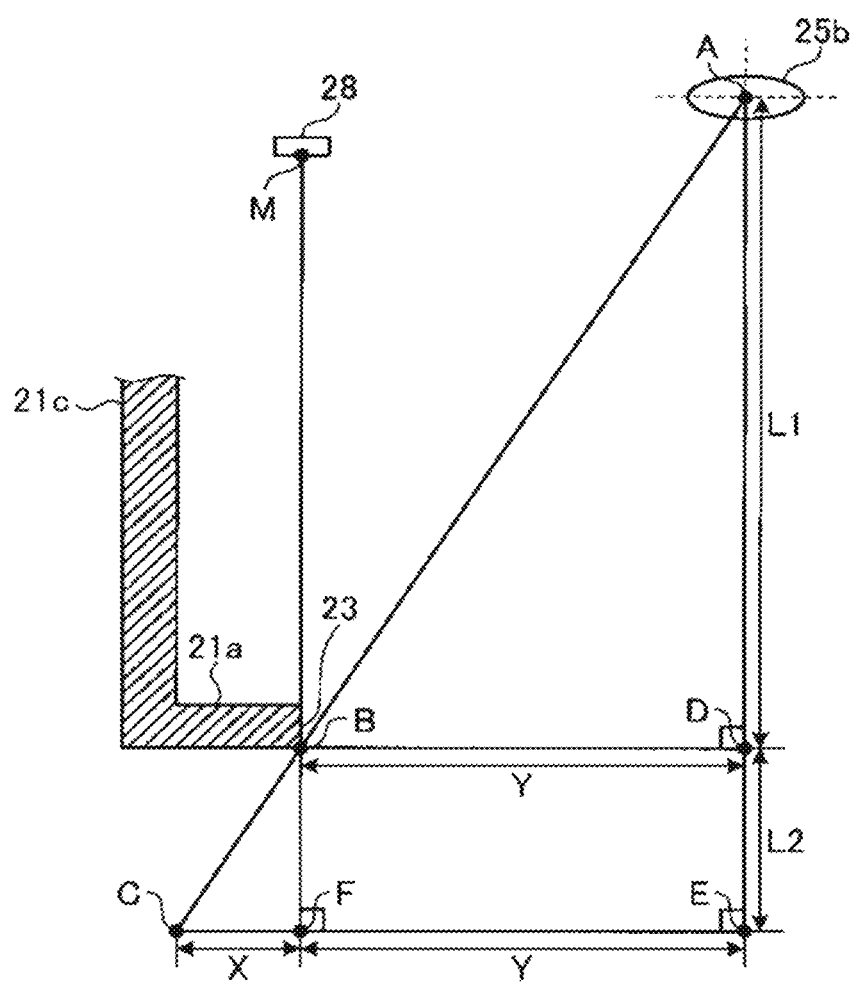
FIG. 18 is a diagram illustrating an example of a method of calculating the distance based on the ratio of the size of a low-brightness region to the size of a high-brightness region.

FIG. 18 illustrates a method for calculating the distance between the housing 21 and the subject outside the housing 21 from the ratio of the size of the low-brightness regions RO_1 to the size of the high-brightness region RO_h. This example illustrates the case where the light sources 28 are mounted on the circuit board 24 so as to be located exactly over the edge of the opening 23.

As illustrated in FIG. 18, let M be the position of the light sources 28, A be the central position of the lens 25b of the sensor unit 25, B be the lower edge position of the opening 23, C be the point of intersection between the extension of a line segment AB and the subject, D be the point of intersection between a straight line extending from the central position A of the lens 25b perpendicular to the subject (the optical axis of the sensor unit 25) and a straight line extending parallel to the subject and passing through the lower edge position B of the opening 23, E be the point of intersection between the extension of a line segment AD and the subject, and F be the point of intersection between the subject and a straight line extending from the position M of the light sources 28 and passing through the lower edge position B of the opening 23. Letting L1 be the length of the line segment AD and L2 be the length of a line segment DE, L2 is the distance between the housing 21 and the subject, i.e., the length to be determined. Letting X be the length of a line segment CF and Y be the length of a line segment FE, X/Y corresponds to the ratio of the size of the low-brightness regions RO_1 to the size of the high-brightness region RO_h.

As can be seen from FIG. 18, even if the value of L2, which is the distance between the housing 21 and the subject, changes, the value of Y does not change, but remains equal to the length of the line segment BD. On the other hand, the value of X decreases with decreasing value of L2 and increases with increasing value of L2. Therefore, the value of L2, which is the distance between the housing 21 and the subject, can be determined if the ratio of the size of the low-brightness regions RO_1 to the size of the high-brightness region RO_h, i.e., X/Y, is determined.

In FIG. 18, a right triangle BCF is similar to a right triangle ABD; therefore, X:L2=Y:L1. Hence, X·L1=L2·Y, which can be transformed into X/Y=L2/L1. Since the value of L1 is a fixed value determined by the mounting position of the sensor unit 25, the value of L2, which is the distance between the housing 21 and the subject, can be determined if the ratio of the size of the low-brightness regions RO_1 to the size of the high-brightness region RO_h, i.e., X/Y, is determined.

Second Distance Calculation Method

Figure 19:
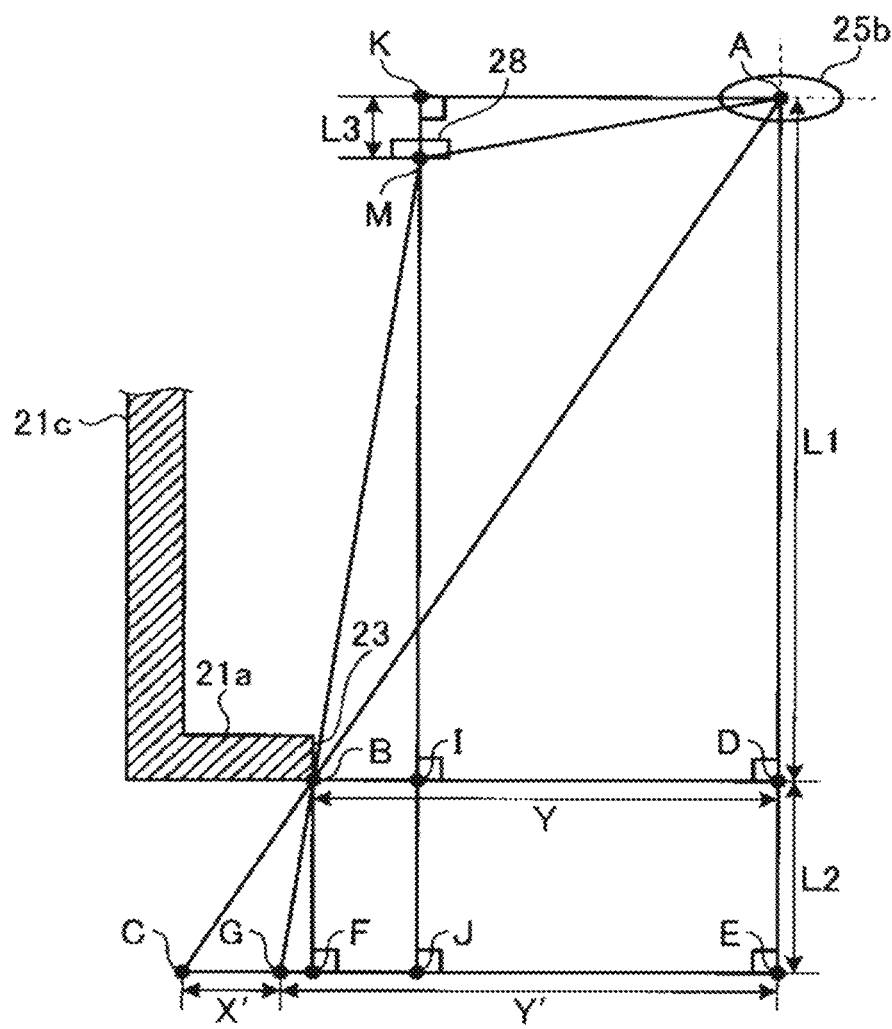
FIG. 19 is a diagram illustrating another example of a method of calculating the distance based on the ratio of the size of a low-brightness region to the size of a high-brightness region.

FIG. 19 illustrates a method for calculating the distance between the housing 21 and the subject outside the housing 21 from the ratio of the size of the low-brightness regions RO_1 to the size of the high-brightness region RO_h. This example illustrates the case where the light sources 28 are mounted on the circuit board 24 so as to be located closer to the lens 25*b* of the sensor unit 25 than exactly over the edge of the opening 23.

As illustrated in FIG. 19, let M be the position of the light sources 28, A be the central position of the lens 25*b* of the sensor unit 25, B be the lower edge position of the opening 23, C be the point of intersection between the extension of a line segment AB and the subject, D be the point of intersection between a straight line extending from the central position A of the lens 25*b* perpendicular to the subject (the optical axis of the sensor unit 25) and a straight line extending parallel to the subject and passing through the lower edge position B of the opening 23, E be the point of intersection between the extension of a line segment AD and the subject, F be the point of intersection between the subject and a straight line extending from the lower edge position B of the opening 23 perpendicular to the subject, G be the point of intersection between the subject and a straight line extending from the light sources 28 and passing through the lower edge position B of the opening 23, I be the point of intersection between a line segment BD and a straight line extending from the position M of the light sources 28 perpendicular to the line segment BD, J be the point of intersection between the extension of a line segment MI and a line segment FE, and K be the point of intersection between a straight line extending parallel to the line segment BD and passing through the central position A of the lens 25*b* and the extension of a line segment IM. Letting L1 be the length of the line segment AD, L2 be the length of a line segment DE, and L3 be the length of a line segment KM, L2 is the distance between the housing 21 and the subject, i.e., the length to be determined. Letting X' be the length of a line segment CG and Y' be the length of a line segment GE, X'/Y' corresponds to the ratio of the size of the low-brightness regions RO_1 to the size of the high-brightness region RO_h.

As can be seen from FIG. 19, if the value of L2, which is the distance between the housing 21 and the subject, is zero, the value of X is zero, and the value of Y' is equal to the length of the line segment BD, i.e., Y. As the value of L2 increases, the value of X' increases at a predetermined rate, and the value of Y' also increases at a predetermined rate. Therefore, the value of L2, which is the distance between the housing 21 and the subject, can be determined if the ratio of the size of the low-brightness regions RO_1 to the size of the high-brightness region RO_h, i.e., X'/Y', is determined.

In FIG. 19, let k be the length of a line segment GF. A right triangle BCF is similar to a right triangle ABD; therefore, $(X'+k):L2=Y:L1$. Hence, $X'=(Y \cdot L2/L1)-k$. In addition, $Y'=Y+k$.

Here, the value of k is determined. Let m be the length of a line segment BI. A right triangle MBI is similar to a right triangle BGF; therefore, $m:(L1-L3)=k:L2$. Hence, $k=L2 \cdot m/(L1-L3)$. Here, $m/(L1-L3)$ is a constant uniquely determined by the layout. Letting a be $m/(L1-L3)$, $k=\alpha \cdot L2$.

Thus, $X=(Y \cdot L2/L1)-\alpha \cdot L2$, and $Y'=Y+\alpha \cdot L2$. $X'=(Y \cdot L2/L1)-\alpha \cdot L2$ can be transformed into $X'=L2((Y/L1)-\alpha)$. Here, Y/L1 is also a constant uniquely determined by the layout. Letting be Y/L1, $X'=L2(\beta-\alpha)$.

Thus, $X'/Y'=L2(\beta-\alpha)/(Y+\alpha \cdot L2)$. Since, as described above, $\alpha=m/(L1-L3)$ and $\beta=Y/L1$ are constants uniquely determined by the layout, the value of L2, which is the distance between the housing 21 and the subject, can be determined if the ratio of the size of the low-brightness regions RO_1 to the size of the high-brightness region RO_h, i.e., X'/Y', is determined.

Third Distance Calculation Method

Figure 20:
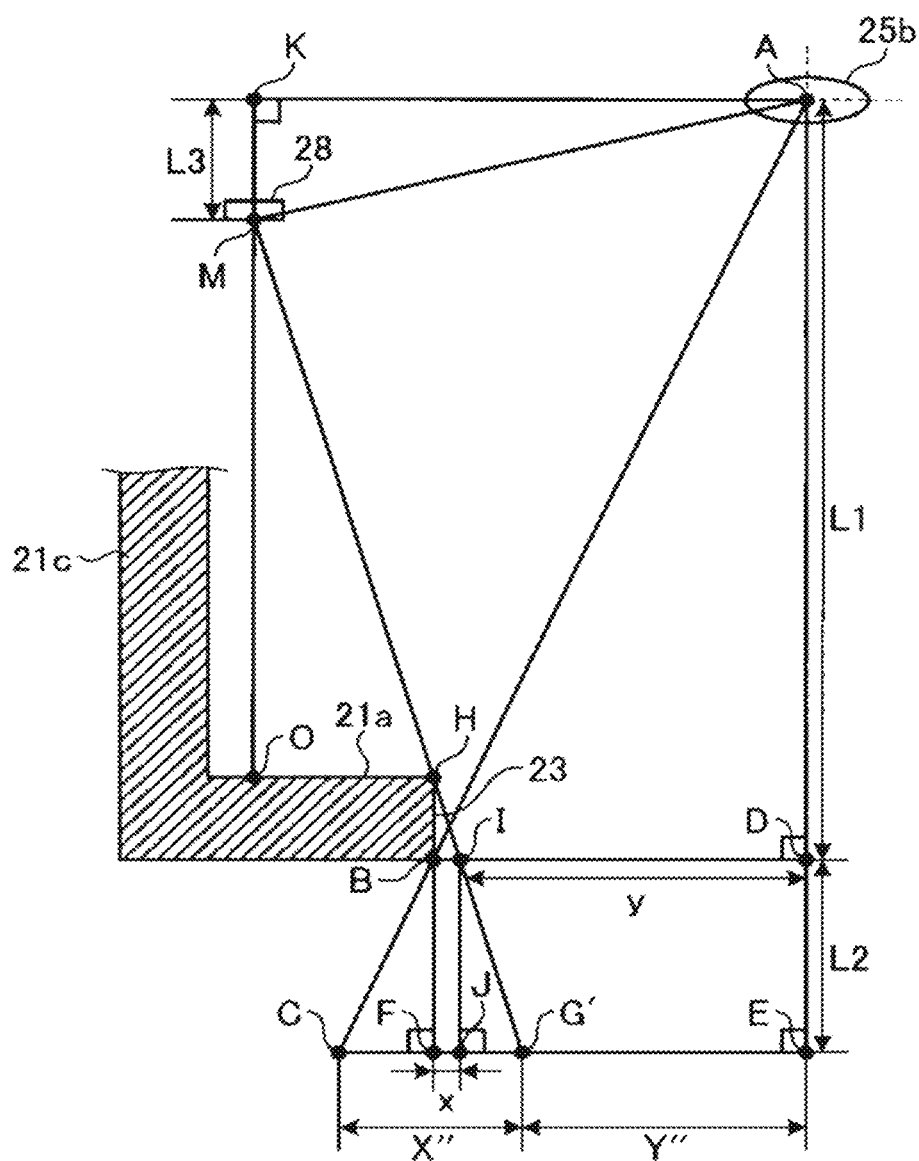
FIG. 20 is a diagram illustrating another example of a method of calculating the distance based on the ratio of the size of a low-brightness region to the size of a high-brightness region.

FIG. 20 illustrates a method for calculating the distance between the housing 21 and the subject outside the housing 21 from the ratio of the size of the low-brightness regions RO_1 to the size of the high-brightness region RO_h. This example illustrates the case where the light sources 28 are mounted on the circuit board 24 so as to be located closer to the sidewall 21*c* than exactly over the edge of the opening 23.

As illustrated in FIG. 20, let M be the position of the light sources 28, A be the central position of the lens 25*b* of the sensor unit 25, B be the lower edge position of the opening 23, H be the upper edge position of the opening 23, C be the point of intersection between the extension of a line segment AB and the subject, D be the point of intersection between a straight line extending from the central position A of the lens 25*b* perpendicular to the subject (the optical axis of the sensor unit 25) and a straight line extending parallel to the subject and passing through the lower edge position B of the opening 23, E be the point of intersection between the extension of a line segment AD and the subject, F be the point of intersection between the subject and a straight line extending from the lower edge position B of the opening 23 perpendicular to the subject, G' be the point of intersection between the subject and a straight line extending from the position M of the light sources 28 and passing through the upper edge position H of the opening 23, I be the point of intersection between a line segment HG' and a line segment BD, J be the point of intersection between the subject and a straight line extending from I perpendicular to the subject, O be the point of intersection between the bottom plate 21*a* of the housing 21 and a straight line extending from the position M of the light sources 28 perpendicular to the bottom plate 21*a*, and K be the point of intersection between a straight line extending parallel to the line segment BD and passing through the central position A of the lens 25*b* and the extension of a line segment OM. Letting L1 be the length of the line segment AD and L2 be the length of a line segment DE, L2 is the distance between the housing 21 and the subject, i.e., the length to be determined. Letting L1 be the length of the line segment AD and L2 be the length of a line segment DE, L2 is the distance between the housing 21 and the subject, i.e., the length to be determined. Letting x be the length of a line segment BI, y be the length of a line segment ID, X" be the length of a line segment CG', and Y" be the length of a line segment GE, X"/Y" corresponds to the ratio of the size of the low-brightness regions RO_1 to the size of the high-brightness region RO_h.

As can be seen from FIG. 20, if the value of L2, which is the distance between the housing 21 and the subject, is zero, the value of X" is x, and the value of Y" is y. As the value of L2 increases, the value of X" increases from x at a predetermined rate, and the value of Y" decreases from y at a predetermined rate. Thus, the value of L2, which is the distance between the housing 21 and the subject, can be determined if the ratio of the size of the low-brightness regions RO_1 to the size of the high-brightness region RO_h, i.e., X"/Y", is determined.

First, the value of x is determined. In FIG. 20, let a be the length of a line segment HB (the thickness of the bottom plate 21*a*), b be the length of a line segment MO, and c be the length of a line segment OH. A right triangle MOH is similar to a right triangle HBI; therefore, $(L1-L3-a):a=c:x$. Hence, $x=a \cdot c/(L1-L3-a)$. If $L2=0$, $X"=x$, and $Y"=y$. Letting d be the length of the line segment BD, $X"/Y"=x/y =\{a \cdot c/(L1-L3-a)\}/\{d-a \cdot c/(L1-L3-a)\}$. Since the values of L1, L3, a, b, c, and d are determined by the layout, $\{a \cdot c/(L1-L3-a)\}/\{d-a \cdot c/(L1-L3-a)\}$ is a fixed value. Thus, if the ratio of the size of the low-brightness regions RO_1 to the size of the high-brightness region RO_h, i.e., X"/Y", is this value, it is determined that L2=0.

The length of a line segment CF and the length of a line segment FG' are then determined. In FIG. 20, let e be the length of the line segment CF and f be the length of the line segment FG'. A right triangle ABD is similar to a right triangle BCF; therefore, L1:d=L2:e. Hence, e=d·L2/L1.

In addition, a right triangle HBI is similar to a right triangle IJG'; therefore, a:x=L2:(f−x). Hence, f=x·(a+L2)/a.

Since CG'=CF+FG', X"=d·L2/L1+x·(a+L2)/a=L2·(d/L1+x/a)+x. Here, d/L1+x/a is a constant uniquely determined by the layout. Letting α be d/L1+x/a, X"=L2·α+x.

The value of X"+Y" is determined. A right triangle ABD is similar to a right triangle ACE; therefore, d:L1=(X"+Y"): (L1+L2). Hence, X"+Y"=d·(L1+L2)/L1=L2·d/L1+d. Here, d/L1 is a constant uniquely determined by the layout. Letting β be d/L1, X"+Y"=L2·β+d. Hence, Y"=L2·β+d−X"=L2·β+d−(L2·α+x).

Thus, X"/Y"=(L2·α+x)/{L2·β+d−(L2·a+x)}. Here, as described above, α=d/L1+x/a and β=d/L1 are constants uniquely determined by the layout. The value of x and the value of d are also constants uniquely determined by the layout. Thus, the value of L2, which is the distance between the housing 21 and the subject, can be determined if the ratio of the size of the low-brightness regions RO_1 to the size of the high-brightness region RO_h, i.e., X"/Y", is determined.

Other Methods

In the foregoing description, the distance between the housing 21 and the subject outside the housing 21 is calculated based on the ratio of the size of the low-brightness regions RO_1 to the size of the high-brightness region RO_h in the subject image region RO. However, as described above, the size of the low-brightness regions RO_1 and the size of the high-brightness region RO_h (in the example in FIG. 18, the size of the low-brightness regions RO_1) change linearly with the distance between the housing 21 and the subject. Thus, a correspondence table indicating the correspondence between the size of the low-brightness regions RO_1 or the high-brightness region RO_h and the distance between the housing 21 and the subject may be prepared in advance, and this correspondence table may be used to calculate the distance between the housing 21 and the subject.

In this case, the correspondence table is prepared by capturing images with the sensor unit 25 while sequentially changing the distance between the housing 21 and the subject, analyzing the resulting images to acquire the size of the low-brightness regions RO_1 or the high-brightness region RO_h, and associating the size of the low-brightness regions RO_1 or the high-brightness region RO_h with the distance between the housing 21 and the subject at which the images have been captured. The correspondence table is stored in, for example, the nonvolatile memory 57 (an example of a first table storage unit). When calculating the distance between the housing 21 and the subject, the distance-calculating unit 58 analyzes an image captured by the sensor unit 25 to acquire the size of the low-brightness regions RO_1 or the high-brightness region RO_h and searches the correspondence table stored in the nonvolatile memory 57 to determine the distance between the housing 21 and the subject corresponding to the acquired size of the low-brightness regions RO_1 or the high-brightness region RO_h.

The distance between the housing 21 and the subject calculated by the distance-calculating unit 58 (in this example, corresponding to the gap between the carriage 15 and the sheet) is passed to the CPU 101 and is used for the setting by the first setting unit 121 described above.

Operation

Figure 21:
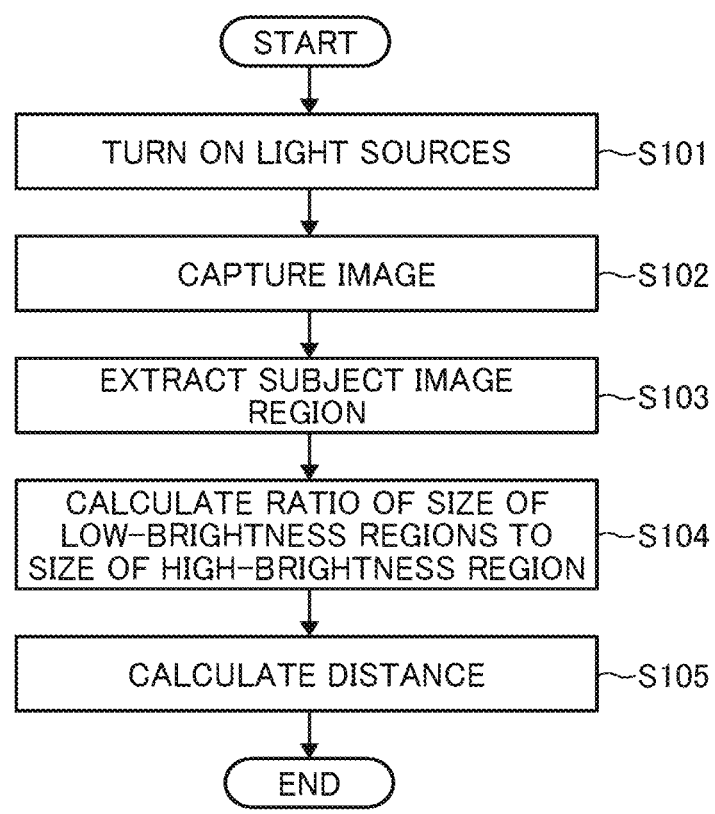
FIG. 21 is a flowchart illustrating an example of a procedure of distance measuring by the image-capturing device according to a variation embodiment.

The distance measurement operation of the image-capturing device 42 according to this modification will be briefly described next. FIG. 21 is a flowchart illustrating a procedure of distance measurement by the image-capturing device 42 according to this modification.

When the image-capturing device 42 according to this modification measures the distance between the housing 21 and the subject outside the housing 21, the light-source drive control unit 51 first turns on the light sources 28 (step S101). While the light sources 28 remain on, the sensor unit 25 captures an image (step S102) An image Im captured by the sensor unit 25 and output from the sensor unit 25 is stored in the frame memory 53.

The distance-calculating unit 58 then extracts the subject image region RO from the image Im captured by the sensor unit 25 and stored in the frame memory 53 (step S103). The distance-calculating unit 58 executes, for example, binarization processing on the extracted subject image region RO and counting the number of black pixels and the number of white pixels, and calculates the ratio of the size of the low-brightness regions RO_1 to the size of the high-brightness region RO_h (step S104). Based on the calculated ratio, the distance-calculating unit 58 calculates the distance between the housing 21 and the subject (step S105) and passes the calculated distance to the CPU 101. Thus, the distance measurement operation of the image-capturing device 42 according to this modification ends.

Liquid

The ink serving as the liquid used for the liquid discharging device and the liquid discharging method according to the present invention contains water, an organic solvent, a coloring material, and a plurality of polysiloxane compounds and may optionally further contain other constituents. The use of such an ink offers good solid area wettability, thus effectively reducing image density unevenness.

Water

The proportion of water in the ink is not particularly limited and can be suitably selected to suit to a particular application. For example, in terms of the drying property and discharging reliability of the ink, the proportion is preferably from 10 to 90 percent by mass and more preferably from 20 to 60 percent by mass.

Organic Solvent

There is no specific limitation to the organic solvent for use in the present disclosure. For example, water-soluble organic solvents can be used. Examples include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, □-caprolactam, and □-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkyl ethers such as ethyl en egl ycol monoethylether, ethyl en egl ycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance permeability of ink for paper used as a recording medium.

The proportion of the organic solvent in the ink has no particular limit and can be suitably selected to suit to a particular application.

In terms of drying property and discharging reliability of ink, the proportion is preferably from 10 to 60 percent by mass and more preferably from 20 to 60 percent by mass.

Coloring Material

The coloring material has no particular limit. For example, pigments and dyes are suitable.

As the pigment, inorganic pigments or organic pigments can be used. These can be used alone or in combination. In addition, it is possible to use a mixed crystal.

As the pigments, for example, black pigments, yellow pigments, magenta pigments, cyan pigments, white pigments, green pigments, orange pigments, and gloss pigments and metallic pigments of gold, silver, etc., can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1). Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.1. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancement of image density, fixability, and discharging stability.

To disperse a pigment in ink, for example, a hydrophilic functional group is introduced into the pigment to prepare a self-dispersible pigment, the surface of the pigment is coated with a resin, or a dispersant is used.

To introduce a hydrophilic group into a pigment to obtain a self-dispersible pigment, for example, a functional group such as a sulfone group and a carboxyl group is added to a pigment (e.g., carbon) to allow it dispersible in water.

To disperse a pigment coated with a resin, a pigment encapsulated into a microcapsule is used to allow the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion can be obtained by dispersing water, a pigment, a pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably 20 to 500 nm and more preferably 20 to 150 nm to improve dispersion stability of the pigment and ameliorate discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

Polysiloxane Compound

If a plurality of polysiloxane compounds are used as surfactants, the solid area wettability can be improved.

If the plurality of polysiloxane compounds include a first polysiloxane compound having —OH at an end of the main chain and a second polysiloxane compound having —OCH$_3$ at an end of the main chain, both the ink storage stability and the solid area wettability can be improved.

The main chain of the first polysiloxane compound may have a structure represented by Chemical formula 1:

Chemical formula 1

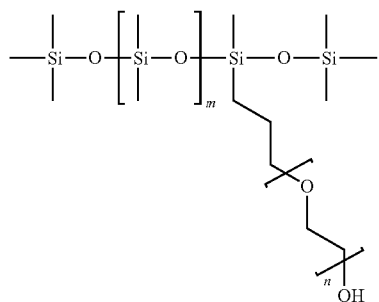

In Chemical formula 1, m and n are each an integer of from 0 to 100 and represent number average degrees of polymerization. In Chemical formula 1, in may be from 0 to 10, and n may be from 0 to 100. From the viewpoint of solid area wettability, m may be from 0 to 5, and n may be from 2 to 19.

Examples of compounds represented by Chemical formula. 1 above include SILFACE SAG013A (available from Nissin Chemical Co., Ltd.), SILFACE SAG503 A (available from Nissin Chemical Co., Ltd.), and BYK345 (available from Byk-Chemie).

The main chain of the second polysiloxane compound may have a structure represented by Chemical formula 2.

Chemical formula 2

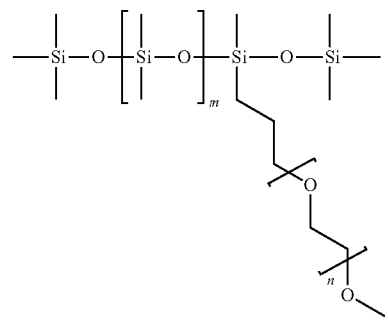

In Chemical formula 2, in and n each, respectively represent integers of from 0 to 100 and represent a number average degree of polymerization. In Chemical formula 2, m may be from 0 to 10, and n may be from 0 to 100. From the viewpoint of solid area wettability, m may be from 0 to 7, and n may be from 2 to 18.

Examples of compounds represented by Chemical formula 2 above include SILFACF. SAG002 (available from Nissin Chemical Co., Ltd.), TAGO WET 270 (available from Evonik), and TACO WET 280 (available from Evonik).

From the viewpoint of ink storage stability, the first polysiloxane compound and the second, polysiloxane compound may be mixed in a ratio (first:second) of from 10:1 to 1:10, or from 10:6 to 6:10. Such mixing ratios are advantageous for improving the dispersion stability of the ink.

The proportion of the plurality of polysiloxane compound is preferably from 0.4 to 4.0 percent by mass and more preferably from 2.0 to 4.0 percent by mass. When the proportion is from 0.4 to 4.0 percent by mass, the ink exhibits sufficient fixability to various impermeable recording media and also provides good image quality such as high gloss.

Resin

The type of the resin contained in the white ink has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particles formed of these resins may be also used. It is possible to mix a resin emulsion in which such resin particles are dispersed in water as a dispersion medium with materials such as a coloring material and an organic solvent to obtain an ink. It is possible to use suitably-synthesized resin particulate. Alternatively, the resin particulate is available on the market. These resin particulates can be used alone or in combination.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image robustness.

The volume average particle diameter can be measured by using, for example, a particle size analyzer (Nanotrac Wave-UT151, manufactured by MicrotracBEL Corp.).

The particle diameter of the solid portion in ink is not particularly limited and can be suitably selected to suit to a particular application. For example, the maximum frequency in the maximum number conversion is preferably 20 to 1,000 nm and more preferably 20 to 150 nm to ameliorate the discharging stability and image quality such as image density. The solid portion includes resin particulate, pigment particulate, etc. The particle diameter can be measured by using a particle size analyzer (Nanotrac Wave-UT151, manufactured by MicrotracBEL Corp).

Additive

The ink may furthermore optionally contain additives such as a surfactant, a defoaming agent, a preservative and fungicide, a corrosion inhibitor, and a pH regulator.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but are not limited thereto.

Preparation Example 1 of Black Pigment Liquid Dispersion

The following ingredients were premixed and dispersed in a circulating manner in a disk-type bead mill (KDL type available from Shinmaru Enterprises Corporation, media: zirconia balls with a diameter of 0.3 mm) for 7 hours to obtain a black pigment liquid dispersion (pigment solid concentration: 15% by mass).

Carbon black pigment (Product: Monarch 800, manufactured by Cabot Corporation): 15 parts
Anionic surfactant (Product: Pionine A-51-B, manufactured by TAKEMOTO OIL & FAT Co., Ltd.): 2 parts
Deionized water: 83 parts Preparation Example 2 of Cyan Pigment Liquid Dispersion A cyan pigment liquid dispersion (pigment solid concentration of 15% by mass) was prepared in the same manner as in Preparation Example 1 of Black Pigment Liquid Dispersion Preparation except that the carbon black pigment was replaced with Pigment Blue 15:3 (LIONOL BLUE FG-7351, available from Toyo Ink SC Holdings Co., Ltd.).

Preparation Example 3 of Magenta Pigment Liquid Dispersion

A magenta pigment liquid dispersion (pigment solid concentration of 15% by mass) was prepared in the same manner as in Preparation Example 1 of Black Pigment Liquid Dispersion except that the carbon black pigment was replaced with Pigment Red 122 (Toner Magenta E002, available from Clariant Japan K.K.).

Preparation Example 4 of Yellow Pigment Liquid Dispersion

A yellow pigment liquid dispersion (pigment solid concentration of 15% by mass) was prepared in the same manner as in Preparation Example 1 of Black Pigment Liquid Dispersion except that the carbon black pigment was replaced with Pigment Yellow 74 (Fast Yellow 531, available from Dainichiseika Color & Chemicals Mfg. Co., Ltd.).

Manufacturing Examples 1 to 11 and Comparative Manufacturing Examples 1 to 4

Manufacturing of Ink

The ingredients other than the polysiloxane compounds shown in Tables 1 to 4 were mixed together. After the mixtures were stirred for 30 minutes or more, the polysiloxane compounds shown in Tables 1 to 4 were added, and the mixtures were further stirred for 30 minutes to prepare inks. The resulting inks were filtered through a polypropylene filter with an average pore size of 0.8 µm to prepare inks of Manufacturing Examples 1 to 11 and Comparative Manufacturing Examples 1 to 4.

TABLE 1

| | | Manufacturing Example 1 | Manufacturing Example 2 | Manufacturing Example 3 | Manufacturing Example 4 | Manufacturing Example 5 |
|---|---|---|---|---|---|---|
| | Black pigment dispersion | 20 | — | — | — | — |
| | Cyan pigment dispersion | — | 20 | — | — | 20 |
| | Magenta pigment dispersion | — | — | 20 | — | — |
| | Yellow pigment dispersion | — | — | — | 20 | — |
| | Polyurethane resin | 7 | 7 | 5 | 7 | 7 |
| Polysiloxane Compound 1 | SAG013 | 2 | 2 | — | — | — |
| | BYK345 | — | — | 0.4 | — | — |
| | SAG503A | — | — | — | 0.3 | 3 |
| Polysiloxane Compound 2 | SAG002 | 2 | — | — | — | 0.5 |
| | WET270 | — | 0.2 | 0.2 | — | — |
| | WET280 | — | — | — | 3 | — |
| Polysiloxane Compound 3 | BYK333 | — | — | — | — | — |
| | Mixing ratio of Polysiloxane Compound 1 to Polysiloxane Compound 2 | 1:1 | 10:1 | 2:1 | 1:10 | 6:1 |
| | 1,2-Propanediol | 4 | — | — | — | — |
| | 1,3-Propanediol | — | 3 | — | 4 | — |

TABLE 1-continued

|  | Manufacturing Example 1 | Manufacturing Example 2 | Manufacturing Example 3 | Manufacturing Example 4 | Manufacturing Example 5 |
| --- | --- | --- | --- | --- | --- |
| 1,3-Butanediol | — | — | 3 | — | 4 |
| 3-Methoxy-N,N-dimethylpropionamide | 15 | 10 | 15 | — | — |
| 3-Butoxy-N,N-dimethylpropionamide | — | — | — | 15 | — |
| Dipropylene glycol monomethyl ether | — | 8 | 7 | — | 8 |
| 3-Methyl-3-oxetanemethanol | 10 | — | 7 | 8 | — |
| 3-Methyl-3-methylbutanol | — | 3 | 5 | — | 2 |
| PROXEL LV (available from Avecia Limited) | 0.1 | 0.1 | 0.1 | 0.1 | 0.1 |
| High-purity water | Balance | Balance | Balance | Balance | Balance |
| Total (% by mass) | 100 | 100 | 100 | 100 | 100 |

TABLE 2

|  |  | Manufacturing Example 6 | Manufacturing Example 7 | Manufacturing Example 8 | Manufacturing Example 9 |
| --- | --- | --- | --- | --- | --- |
| Black pigment dispersion | | — | — | 20 | — |
| Cyan pigment dispersion | | 20 | — | — | — |
| Magenta pigment dispersion | | — | 20 | — | 20 |
| Yellow pigment dispersion | | — | — | — | — |
| Polyurethane resin | | 6 | 6 | 5 | 6 |
| Polysiloxane Compound 1 | SAG013 | — | 0.15 | 2 | — |
|  | BYK345 | 1 | — | — | — |
|  | SAG503A | — | — | 3 | — |
| Polysiloxane Compound 2 | SAG002 | — | — | — | 2 |
|  | WET270 | — | 0.25 | — | — |
|  | WET280 | 1.5 | — | — | — |
| Polysiloxane Compound 3 | BYK333 | — | — | — | 2 |
| Mixing ratio of Polysiloxane Compound 1 to Polysiloxane Compound 2 | | 2:3 | 3:5 | — | — |
| 1,2-Propanediol | | 3 | — | 3 | 4 |
| 1,3-Propanediol | | — | 3 | — | — |
| 1,3-Butanediol | | — | — | — | — |
| 3-Methoxy-N,N-dimethylpropionamide | | — | — | 15 | 15 |
| 3-Butoxy-N,N-dimethylpropionamide | | 20 | 20 | — | — |
| Dipropylene glycol monomethyl ether | | — | — | — | 5 |
| 3-Methyl-3-oxetanemethanol | | 9 | 8 | 10 | 6 |
| 3-Methyl-3-methylbutanol | | — | — | — | 7 |
| PROXEL LV (available from Avecia Limited) | | 0.1 | 0.1 | 0.1 | 0.1 |
| High-purity water | | Balance | Balance | Balance | Balance |
| Total (% by mass) | | 100 | 100 | 100 | 100 |

TABLE 3

|  |  | Manufacturing Example 10 | Manufacturing Example 11 |
|---|---|---|---|
| Black pigment dispersion |  | — | — |
| Cyan pigment dispersion |  | 20 | 20 |
| Magenta pigment dispersion |  | — | — |
| Yellow pigment dispersion |  | — | — |
| Polyurethane resin |  | — | 6 |
| Polysiloxane Compound 1 | SAG013 | 2.5 | — |
|  | BYK345 | — | 1 |
|  | SAG503A | — | — |
| Polysiloxane Compound 2 | SAG002 | — | — |
|  | WET270 | 0.2 | — |
|  | WET280 | — | — |
| Polysiloxane Compound 3 | BYK333 | — | 1.5 |
| Mixing ratio of Polysiloxane Compound 1 to Polysiloxane Compound 2 |  | 252 | — |
| 1,2-Propanediol |  | 3 | 3 |
| 1,3-Propanediol |  | — | — |
| 1,3-Butanediol |  | — | — |
| 3-Methoxy-N,N-dimethylpropionamide |  | 10 | — |
| 3-Butoxy-N,N-dimethylpropionamide |  | — | 20 |
| Dipropylene glycol monomethyl ether |  | 5 | — |
| 3-Methyl-3-oxetanemethanol |  | — | 9 |
| 3-Methyl-3-methylbutanol |  | 5 | — |
| PROXEL LV (available from Avecia Limited) |  | 0.1 | 0.1 |
| High-purity water |  | Balance | Balance |
| Total (% by mass) |  | 100 | 100 |

TABLE 4

|  |  | Comparative Manufacturing Example 1 | Comparative Manufacturing Example 2 | Comparative Manufacturing Example 3 | Comparative Manufacturing Example 4 |
|---|---|---|---|---|---|
| Black pigment dispersion |  | 20 | — | — | — |
| Cyan pigment dispersion |  | — | — | 20 | 20 |
| Magenta pigment dispersion |  | — | 20 | — | — |
| Yellow pigment dispersion |  | — | — | — | — |
| Polyurethane resin |  | 6 | 5 | 5 | 5 |
| Polysiloxane Compound 1 | SAG013 | — | — | — | — |
|  | BYK345 | 3 | — | — | — |
|  | SAG503A | — | — | — | — |
| Polysiloxane Compound 2 | SAG002 | — | — | — | — |
|  | WET270 | — | — | — | — |
|  | WET280 | — | 1 | — | — |
| Polysiloxane Compound 3 | BYK333 | — | — | 2 | — |
| Mixing ratio of Polysiloxane Compound 1 to Polysiloxane Compound 2 |  | — | — | — | — |
| 1,2-Propanediol |  | 4 | — | — | — |
| 1,3-Propanediol |  | — | 3 | 3 | 3 |
| 1,3-Butanediol |  | — | — | — | — |
| 3-Methoxy-N,N-dimethylpropionamide |  | 15 | 15 | 15 | 15 |
| 3-Butoxy-N,N-dimethylpropionamide |  | — | — | — | — |
| Dipropylene glycol monomethyl ether |  | — | — | — | — |
| 3-Methyl-3-oxetanemethanol |  | 7 | 9 | 9 | 9 |
| 3-Methyl-3-methylbutanol |  | — | — | — | — |
| PROXEL LV (available from Avecia Limited) |  | 0.1 | 0.1 | 0.1 | 0.1 |
| High-purity water |  | Balance | Balance | Balance | Balance |
| Total (% by mass) |  | 100 | 100 | 100 | 100 |

The details of the individual ingredients in Tables 1 to 4 are as follows: Polyurethane resin: SUPERFLEX 150 (available from DKS Co. Ltd., solid content of 30% by mass)

Polysiloxane Compound 1
    SILFACE SAG013, available from Nissin Chemical Co., Ltd.
    BYK345, available from Byk-Chemie
    SILFACE SAG503A, available from Nissin Chemical Co., Ltd. Polysiloxane Compound 2
    SILFACE SAG002, available from Nissin Chemical Co., Ltd.
    TAGO WET 270, available from Evonik
    TAGO WET 280, available from Evonik

TABLE 5

| | | Having-OH at end of main chain | Having-OCH$_3$ at end of main chain | Structural formula of polysiloxane | (m, n) in Chemical formula Distribution | Average of m | Average of n |
|---|---|---|---|---|---|---|---|
| Polysiloxane Compound 1 | SAG013 | Yes | No | Chemical formula 1 | (0, 2-19) | 0 | 8.4 |
| | BYK345 | Yes | No | Chemical formula 1 | (0-5, 2-10) | 1 | 4.8 |
| | SAG503A | Yes | No | Chemical formula 1 | (0-5, 3-17) | 1.1 | 8.1 |
| Polysiloxane Compound 2 | SAG002 | No | Yes | Chemical formula 2 | (0, 2-18) | 0 | 7.8 |
| | WET270 | No | Yes | Chemical formula 2 | (0-7, 2-15) | 1.7 | 7.2 |
| | WET280 | No | Yes | Chemical formula 2 | (0-6, 2-15) | 1.3 | 7.6 |
| Polysiloxane Compound 3 | BYK333 | Yes | No | Chemical formula 3 | Not available | 41 | 40.3 |

*Polysiloxane Compound 3 (BYK333, available from Byk-Chemie, having a structure represented by Chemical formula 3 below)

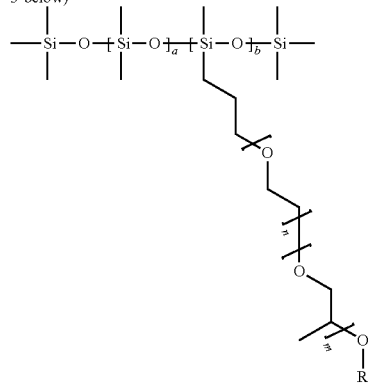

Chemical formula 3

In Chemical formula 3, a, b, m, and n are 6.2, 1.41, and 40.3, respectively, and each represent a number average degree of polymerization of a polymer chain length distribution The thus-prepared inks were evaluated for storage stability as follows. The results are shown in Table 6.

Storage Stability of Ink

The resulting inks were placed in vials (SV-50A, available from Nichiden-Rika Glass Co., Ltd.) and were allowed to stand at 70° C. for 2 weeks. Thereafter, the viscosity of each ink at 25° C. was measured with a viscometer (available from Toki Sangyo Co., Ltd., model: RE8SL). The change in viscosity from the initial viscosity was determined and rated on the following scale:

Rating Scale

Very good: The change in viscosity from the initial viscosity was less than 1%.
Good: The change in viscosity from the initial viscosity was from 1% to less than 3%.
Fair: The change in viscosity from the initial viscosity was from 3% to less than 5%.
Poor: The change in viscosity from the initial viscosity was 5% or more.

Examples 1 to 11 and Comparative Examples 1 to 4

Image-Forming Method

Next, the inks of Manufacturing Examples 1 to 11 and Comparative Manufacturing Examples 1 to 4 were used to form solid images using the pattern image illustrated in FIG. 13 on polyvinyl chloride (PVC) recording media (GIY-11Z5, available from Lintec Corporation) using the inkjet recording device illustrated in FIG. 1 as a liquid discharging device according to the present invention based on the control illustrated in the flowchart in FIG. 12.

The resulting images were evaluated for solid area wettability and image density unevenness as follows. The results are shown in Table 6.

Solid Area Wettability

The solid areas of the resulting images were observed under a microscope (VHX-200 available from Keyence Corporation) at 20× magnification. The deposited ink area was measured as the area other than the area where no ink was deposited in the observation image. The solid area wettability was rated on the following scale.

Rating Scale

Very good: The deposited ink area was 100%.
Good: The deposited ink area was from 98% to less than 100%.
Fair: The deposited ink area was from 95% to less than 98%.
Poor: The deposited ink area was less than 95%.

Image Density Unevenness

Grids were made in the solid areas of the resulting images such that the solid areas were divided into four equal parts in each of the vertical and horizontal directions. The density was measured at the nine points of grid intersection with a colorimeter (X-Rite eXact available from X-Rite, Inc.). The image density unevenness was rated on the following scale.

Rating Scale

Very good: Difference between the maximum image density and the minimum image density was less than 0.1.

Good: Difference between the maximum image density and the minimum image density was from 0.1 to less than 0.15.

Fair: Difference between the maximum image density and the minimum image density was from 0.15 to less than 0.2.

Poor: Difference between the maximum image density and the minimum image density was 0.2 or more.

TABLE 6

| Ink | | Solid area wettability | Image density unevenness | Ink storage stability |
| --- | --- | --- | --- | --- |
| Example 1 | Manufacturing Example 1 | Good | Very good | Good |
| Example 2 | Manufacturing Example 2 | Good | Good | Good |
| Example 3 | Manufacturing Example 3 | Good | Good | Very good |
| Example 4 | Manufacturing Example 4 | Very good | Very good | Good |
| Example 5 | Manufacturing Example 5 | Very good | Very good | Good |
| Example 6 | Manufacturing Example 6 | Good | Good | Good |
| Example 7 | Manufacturing Example 7 | Good | Good | Good |
| Example 8 | Manufacturing Example 8 | Fair | Fair | Fair |
| Example 9 | Manufacturing Example 9 | Fair | Fair | Good |
| Example 10 | Manufacturing Example 10 | Good | Good | Fair |
| Example 11 | Manufacturing Example 11 | Fair | Fair | Fair |
| Comparative Example 1 | Comparative Manufacturing Example 1 | Poor | Poor | Poor |
| Comparative Example 2 | Comparative Manufacturing Example 2 | Poor | Poor | Poor |
| Comparative Example 3 | Comparative Manufacturing Example 3 | Poor | Poor | Poor |
| Comparative Example 4 | Comparative Manufacturing Example 4 | Poor | Poor | Poor |

The results in Table 6 demonstrate that the inkjet recording devicees of Examples 1 to 11, which used inks containing a plurality of polysiloxane compounds, namely, the inks of Examples 1 to 11, achieved a higher solid area wettability and formed images with a smaller image density unevenness than the inkjet recording devicees of Comparative Examples 1 to 4.

Aspects of the present disclosure are, for example, as follows.

1. A liquid discharging device includes a carriage carrying a head configured to discharge a liquid onto a target, the liquid containing an ink, the ink containing water, an organic solvent, a coloring material, and a plurality of polysiloxane compounds, a driving unit configured to move the carriage and the target relatively to each other, a measuring unit configured to measure a distance between the carriage and the target, an image-capturing unit configured to capture a target image, and a setting unit configured to set a liquid discharging performance of the head based on a measurement result obtained by the measuring unit and the target image obtained by the image-capturing unit.

2. The liquid discharging device according to I mentioned above, wherein the plurality of poly silos ane compounds include a first polysiloxane compound having a main chain having —OH at a terminal and a second polysitoxane compound having a main chain having —OCH$_3$ at a terminal.

3. The liquid discharging device according to 2 mentioned above, wherein the main chain of the first polysiloxane compound has a structure represented by Chemical formula 1.

Chemical formula 1

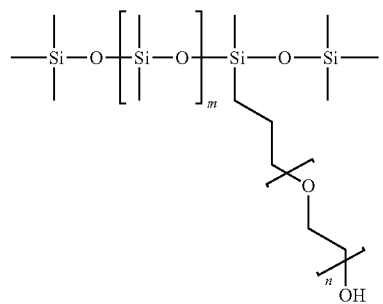

where m and n each, respectively represent integers of from 1 to 100, wherein the main chain of the second polysiloxane compound has a structure represented by Chemical formula 2, Chemical formula 2

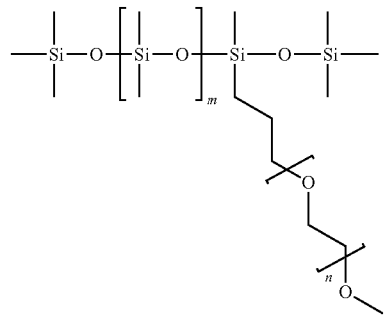

where m and n each, respectively represent integers of from 0 to 100.

4. The liquid discharging device according to 2 or 3 mentioned above, wherein the first polysiloxane compound and the second polysiloxane compound are mixed in a ratio (the first polysiloxane compound to the second polysiloxane compound) of from 10.1 to 1:10.

5. The liquid discharging device according to any one of 1 to 4 mentioned above, wherein the measuring unit is configured to measure the distance between the carriage and the target based on the target image.

6. The liquid discharging device according to any one of 1 to 5 mentioned above, wherein the setting unit includes a first setting unit configured to set a liquid discharging timing of the head based on the measurement result obtained by the measuring unit, and a second setting unit configured to reset the liquid discharging timing of the head or to set a droplet size based on a captured pattern image as the target image obtained by capturing a pattern image formed on the target after the first setting unit sets the liquid discharging timing of the head.

7. The liquid discharging device according to 6 mentioned above, wherein the pattern image includes a particular color image with each pixel set to have equal density, and the second setting unit is configured to reset the liquid discharging timing of the head or to set the droplet size if the difference between the maximum density and the minimum density of the captured pattern image in the pattern image is greater than or equal to a threshold.

8. A liquid discharging method includes moving a carriage and a target relatively to each other, the carriage carrying a head configured to discharge a liquid onto the target, the liquid containing an ink, the ink containing water, an organic solvent, a coloring material, and a plurality of polysiloxane compounds, measuring a distance between the carriage and the target, capturing a target image, and setting a liquid discharging performance of the head based on a measurement result obtained by the measuring and the target image obtained by the capturing.

9. The liquid discharging method according to 8 mentioned above, wherein the plurality of polysiloxane compounds include a first polysiloxane compound having a main chain having —OH at a terminal and a second poly silaxane compound having a main chain having —OCH$_4$ at a terminal.

10. The liquid discharging method according to 9 mentioned above, wherein the main chain of the first polysiloxane compound has a structure represented by Chemical formula 1

Chemical formula 1

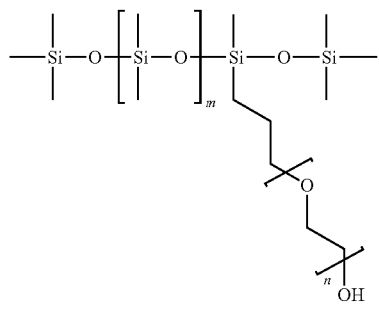

where m and n each, respectively represent integers of from 1 to 100, wherein the main chain of the second polysiloxane compound has a structure represented by Chemical formula 2, Chemical formula 2

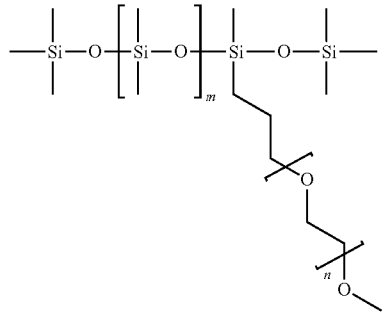

where m and n each, respectively represent integers of from 0 to 100.

11. The liquid discharging method according to 9 or 10 mentioned above, wherein the first polysiloxane compound and the second polysiloxane compound are mixed in a ratio (the first polysiloxane compound to the second polysiloxane compound) of from 10:1 to 1:10.

12. The liquid discharging method according to any one of 8 to 11 mentioned above, wherein the measuring unit is configured to measure the distance between the carriage and the target based on the target image.

13. The liquid discharging method according to any one of 8 to 12 mentioned above, wherein the setting unit includes a first setting unit configured to set a liquid discharging timing of the head based on the measurement result obtained by the measuring unit and a second setting unit configured to reset the liquid discharging timing of the head or to set a droplet size based on a captured pattern image as the target image obtained by capturing a pattern image formed on the target after the first setting unit sets the liquid discharging timing of the head.

14. The liquid discharging device according to 13, wherein the pattern image includes a particular color image with each pixel set to have equal density, and the second setting unit is configured to reset the liquid discharging timing of the head or to set the droplet size if the difference between the maximum density and the minimum density of the captured pattern image in the pattern image is greater than or equal to a threshold.

Having now fully described embodiments of the present invention, it will be apparent to one of ordinary skill in the art that many changes and modifications can be made thereto without departing from the spirit and scope of embodiments of the invention as set forth herein.

What is claimed is:

1. A liquid discharging device, comprising:
a carriage carrying a head configured to discharge a liquid onto a target, the liquid comprising an ink, the ink comprising water, an organic solvent, a coloring material, and a plurality of polysiloxane compounds;
a driving unit configured to move the carriage and the target relatively to each other;
a measuring unit configured to measure a distance between the carriage and the target;
an image-capturing unit configured to capture a target image; and
a setting unit configured to set a liquid discharging performance of the head based on a measurement result obtained by the measuring unit and the target image obtained by the image-capturing unit,
wherein the plurality of polysiloxane compounds comprise a first polysiloxane compound comprising a main chain comprising, —OH at a terminal and a second polysiloxane compound comprising a main chain comprising —OCH$_3$ at a terminal, wherein the main chain of the first polysiloxane compound has a structure of formula (1)

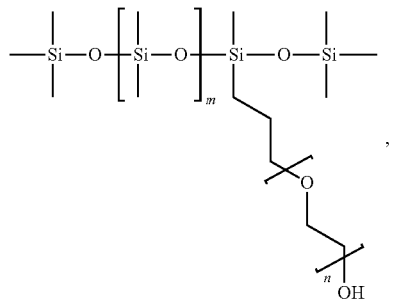

(1)

and wherein the main chain of the second polysiloxane compound has a structure of formula (2)

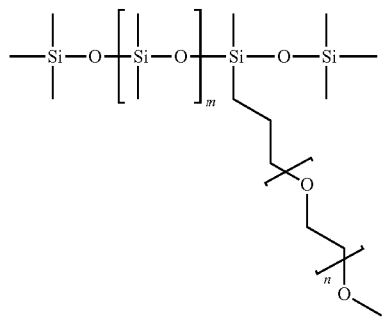

(2)

wherein m and n are independently integers in a range of from 0 to 100.

2. The device of claim 1 wherein, in the first polysiloxane compound, m is no more than 10

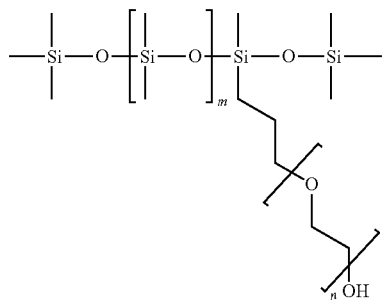

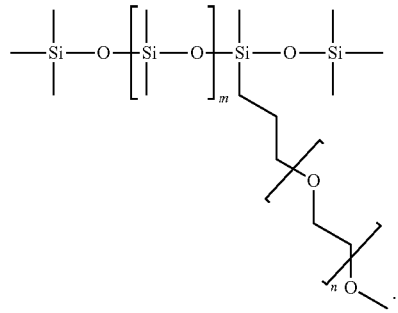

3. The device of claim 1, wherein the first polysiloxane compound and the second polysiloxane compound are mixed in a ratio of the first polysiloxane compound to the second polysiloxane compound, in a range of from 10:1 to 1:10.

4. The device of claim 3, wherein the ratio of the first polysiloxane compound to the second polysiloxane compound is in a range of from 10:6 to 6:10.

5. The device of claim 1, wherein the measuring unit is configured to measure a distance between the carriage and the target based on the target image.

6. The device of claim 1, wherein the setting unit comprises a first setting unit configured to set a liquid discharging timing of the head based on the measurement result obtained by the measuring unit, and wherein a second setting unit configured to reset the liquid discharging timing of the head or to set a droplet size based on a captured pattern image as the target image obtained by capturing a pattern image formed on the target after the first setting unit sets the liquid discharging timing of the head.

7. The device of claim 6, wherein the pattern image comprises a particular color image with each pixel set to have equal density, and wherein the second setting unit is configured to reset the liquid discharging timing of the head or to set the droplet size if a difference between a maximum density and a minimum density of the captured pattern image in the pattern image is greater than or equal to a threshold.

8. The device of claim 1, wherein, in the first polysiloxane compound, n is an integer in a range of from 2 to 19.

9. The device of claim 1, wherein, in the second polysiloxane compound, m is no more than 10.

10. The device of claim 1, wherein, in the second polysiloxane compound, n is an integer in a range of from 2 to 19.

11. The device of claim 1, wherein, in the first polysiloxane compound, m is no more than 5 and n is an integer in a range of from 2 to 19.

12. The device of claim 1, wherein, in the second polysiloxane compound, m is no more than 5 and n is an integer in a range of from 2 to 19.

13. The device of claim 1, wherein, in the first polysiloxane compound, m is no more than 5 and n is an integer in a range of from 2 to 19, and
wherein, in the second polysiloxane compound, m is no more than 5 and n is an integer in a range of from 2 to 19.

14. The device of claim 1, wherein the plurality of polysiloxane compounds is present in the ink in a range of from 0.4 to 4.0 mass %, based on total ink mass.

15. The device of claim 1, wherein the plurality of polysiloxane compounds is present in the ink in a range of from 2.0 to 4.0 mass %, based on total ink mass.

16. The device of claim 1, wherein the water is present in the ink in a range of from 10 to 90 mass %, based on total ink mass.

17. The device of claim 1, wherein the coloring material comprises an inorganic pigment.

18. The device of claim 1, wherein the coloring material comprises an organic pigment.

19. The device of claim 1, wherein the organic solvent comprises a polyol.

20. A liquid discharging method, comprising:
moving a carriage and a target relatively to each other, the carriage carrying a head configured to discharge a liquid onto the target, the liquid comprising an ink, the ink comprising water, an organic solvent, a coloring material, and a plurality of polysiloxane compounds;
measuring a distance between the carriage and the target;
capturing a target image; and
setting a liquid discharging performance of the head based on a measurement result obtained by the measuring and the target image obtained by the capturing,
wherein the plurality of polysiloxane compounds comprise a first polysiloxane compound comprising a main chain comprising —OH at a terminal and a second polysiloxane compound comprising a main chain comprising —OCH$_3$ at a terminal,
wherein the main chain of the first polysiloxane compound has a structure of formula (1)

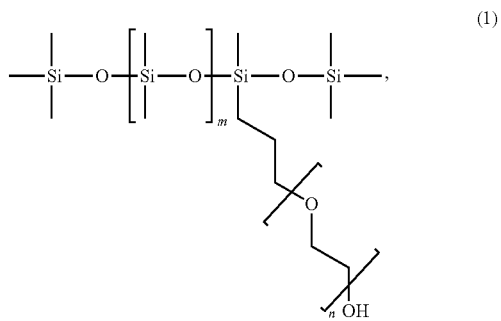

and
wherein the main chain of the second polysiloxane compound has a structure of formula (2)

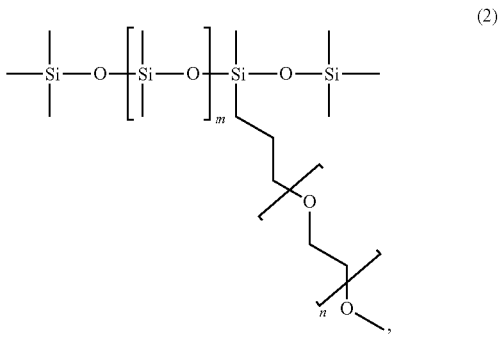

wherein m and n are independently integers in a range of from 0 to 100.

* * * * *